US011148221B2

(12) United States Patent
Bales et al.

(10) Patent No.: US 11,148,221 B2
(45) Date of Patent: Oct. 19, 2021

(54) METHOD OF FORMING GAS TURBINE ENGINE COMPONENTS

(71) Applicant: United Technologies Corporation, Farmington, CT (US)

(72) Inventors: Daniel A. Bales, Avon, CT (US); Thomas DeMichael, Stafford Springs, CT (US); Robert C. Dolan, Coventry, CT (US); Francis B. Parisi, West Suffield, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 395 days.

(21) Appl. No.: 16/555,223

(22) Filed: Aug. 29, 2019

(65) Prior Publication Data

US 2021/0060692 A1 Mar. 4, 2021

(51) Int. Cl.
| | | |
|---|---|---|
| B23K 20/02 | (2006.01) |
| B21D 11/14 | (2006.01) |
| F01D 5/14 | (2006.01) |
| F01D 5/18 | (2006.01) |
| B23P 15/04 | (2006.01) |
| B23K 20/00 | (2006.01) |
| B23K 101/00 | (2006.01) |

(52) U.S. Cl.
CPC ............ *B23K 20/023* (2013.01); *B21D 11/14* (2013.01); *B23P 15/04* (2013.01); *F01D 5/147* (2013.01); *F01D 5/18* (2013.01); *B23K 20/002* (2013.01); *B23K 2101/001* (2018.08); *Y10T 29/49339* (2015.01)

(58) Field of Classification Search
CPC ............ Y10T 29/49339; B23K 20/023; B23K 2101/001; B23K 37/003; B21D 11/14; B21D 22/022; B23P 15/04; F16B 11/006; F16B 11/00; B32J 13/10; B32J 13/12
USPC ............................................... 156/322, 309.9
See application file for complete search history.

(56) References Cited

U.S. PATENT DOCUMENTS

| | | | | | |
|---|---|---|---|---|---|
| 1,511,540 | A | * | 10/1924 | Thomas | B21J 13/10 |
| | | | | | 72/376 |
| 1,920,652 | A | * | 8/1933 | Mckee | C21D 9/00 |
| | | | | | 148/646 |
| 2,221,539 | A | * | 11/1940 | Fayette | B21J 13/10 |
| | | | | | 72/311 |
| 3,630,391 | A | * | 12/1971 | Wilson | B21D 43/10 |
| | | | | | 414/744.8 |

(Continued)

FOREIGN PATENT DOCUMENTS

GB 2073631 10/1981

*Primary Examiner* — Jason L Vaughan
(74) *Attorney, Agent, or Firm* — Carlson, Gaskey & Olds, P.C.

(57) ABSTRACT

A method of forming a gas turbine engine component according to an example of the present disclosure includes, among other things, attaching a cover skin to an airfoil body, the airfoil body and the cover skin cooperating to establish pressure and suction sides of an airfoil, positioning the airfoil between first and second dies of a deforming station, heating the airfoil body to a first predefined temperature threshold between the first and second dies, and moving the first die relative to the second die to hold the airfoil between the first and second dies subsequent to the heating step, and then deforming the airfoil between the first and second dies.

18 Claims, 16 Drawing Sheets

(56) References Cited

U.S. PATENT DOCUMENTS

| | | | |
|---|---|---|---|
| 3,653,110 A * | 4/1972 | King, Jr. | F01D 5/28 |
| | | | 29/889.72 |
| 4,010,530 A * | 3/1977 | Delgrosso | F04D 29/324 |
| | | | 29/889.71 |
| 4,188,811 A | 2/1980 | Brimm | |
| 4,449,390 A * | 5/1984 | Pontini | B21J 13/08 |
| | | | 29/34 R |
| 4,548,544 A * | 10/1985 | Van Appledorn | B21J 13/10 |
| | | | 198/750.11 |
| 5,063,662 A * | 11/1991 | Porter | B23P 15/04 |
| | | | 148/671 |
| 5,269,058 A | 12/1993 | Wiggs et al. | |
| 5,636,440 A * | 6/1997 | Bichon | B21D 26/055 |
| | | | 29/889.7 |
| 5,933,951 A * | 8/1999 | Bergue | B21D 22/20 |
| | | | 29/889.7 |
| 7,237,709 B2 | 7/2007 | Beckford | |
| 7,526,862 B2 * | 5/2009 | Leveque | B21D 53/78 |
| | | | 228/136 |
| 7,993,105 B2 | 8/2011 | Weisse et al. | |
| 8,205,476 B2 | 6/2012 | Voice | |
| 8,256,118 B2 | 9/2012 | Cammer | |
| 9,010,166 B2 | 4/2015 | Brennand | |
| 9,790,800 B2 | 10/2017 | Quigley | |
| 10,052,678 B2 * | 8/2018 | Takeda | B21D 43/105 |
| 10,730,151 B2 * | 8/2020 | Parkin | B21D 53/78 |
| 10,808,542 B2 * | 10/2020 | Bales | B21D 11/20 |
| 2011/0211965 A1 * | 9/2011 | Deal | F01D 5/147 |
| | | | 416/223 R |
| 2015/0190893 A1 | 7/2015 | Parkin et al. | |
| 2018/0318966 A1 | 11/2018 | Evans et al. | |
| 2019/0040744 A1 | 2/2019 | Bales et al. | |

* cited by examiner

METHOD OF FORMING GAS TURBINE ENGINE COMPONENTS

BACKGROUND

This disclosure relates to a gas turbine engine, and more particularly to forming gas turbine engine components including airfoils.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

Some fans include hollow fan blades made of a metallic or composite material. Various techniques can be utilized to construct hollow fan blades, including attaching a cover skin to an airfoil body.

SUMMARY

A method of forming a gas turbine engine component according to an example of the present disclosure includes attaching a cover skin to an airfoil body, the airfoil body and the cover skin cooperating to establish pressure and suction sides of an airfoil, positioning the airfoil between first and second dies of a deforming station, heating the airfoil body to a first predefined temperature threshold between the first and second dies, and moving the first die relative to the second die to hold the airfoil between the first and second dies subsequent to the heating step, and then deforming the airfoil between the first and second dies.

In a further embodiment of any of the foregoing embodiments, the airfoil is a fan blade.

In a further embodiment of any of the foregoing embodiments, the airfoil is metallic.

In a further embodiment of any of the foregoing embodiments, at least a majority of surfaces of the airfoil are spaced apart from the first and second dies during the heating step.

In a further embodiment of any of the foregoing embodiments, the positioning step includes suspending the airfoil in a vertical direction from a support fixture and moving the airfoil in the vertical direction between the first and second dies.

A further embodiment of any of the foregoing embodiments includes moving the airfoil from the deforming station to a cooling chamber of a cool down station subsequent to the deforming step, and cooling the airfoil in the cooling chamber to a second predefined temperature threshold less than the first predefined temperature threshold.

In a further embodiment of any of the foregoing embodiments, the step of moving the airfoil from the deforming station to the cooling chamber includes moving the airfoil along a substantially arcuate path extending between the first and second dies and the cooling chamber.

In a further embodiment of any of the foregoing embodiments, the step of moving the airfoil includes translating the airfoil axially along a longitudinal axis of the cooling chamber between first and second positions, and rotating the airfoil about the longitudinal axis between the first and second positions.

In a further embodiment of any of the foregoing embodiments, walls of the cooling chamber are twisted about the longitudinal axis such that a first end portion of the cooling chamber is offset from a second, opposed end portion of the cooling chamber.

A further embodiment of any of the foregoing embodiments includes conveying cooling flow to a plurality of cooling regions along the longitudinal axis of the cooling chamber such that a predefined temperature gradient is established between the first and second end portions during the cooling step.

In a further embodiment of any of the foregoing embodiments, the airfoil body extends from a root section to a tip portion. The tip portion defines a stagger angle relative to the root section, and the stagger angle is greater than or equal to 10 degrees, absolute, prior to the attaching step.

In a further embodiment of any of the foregoing embodiments, the deforming step occurs such that a change in the stagger angle of the airfoil presented to the deforming station is no more than 2 degrees, absolute.

In a further embodiment of any of the foregoing embodiments, the first predefined temperature threshold is equal to or greater than 1200 degrees Fahrenheit.

In a further embodiment of any of the foregoing embodiments, the attaching step includes welding at least a perimeter of the cover skin to the airfoil body. The cover skin is dimensioned to enclose at least one internal cavity in the airfoil body.

A method of forming a gas turbine engine component according to an example of the present disclosure includes welding a cover skin to an airfoil body to define an airfoil such that the airfoil body is twisted along a spanwise axis to define a stagger angle, heating the airfoil body and the cover skin to a predefined temperature threshold between first and second dies of a deforming station while the airfoil body and the cover skin are spaced apart from the first and second dies, and deforming the airfoil between the first and second dies subsequent to the heating step.

A further embodiment of any of the foregoing embodiments includes moving the first die towards the second die to hold the airfoil body between the first and second dies subsequent to the heating step, but prior to the deforming step.

In a further embodiment of any of the foregoing embodiments, the airfoil body extends from a root section to a tip portion, and the stagger angle is greater than or equal to 10 degrees, absolute, at the tip portion relative to the root section prior to the welding step. The deforming step occurs such that a change in the stagger angle of the airfoil presented to the deforming station is no more than 1 degree, absolute.

In a further embodiment of any of the foregoing embodiments, the welding step includes enclosing at least one internal cavity between the airfoil body and the cover skin.

A further embodiment of any of the foregoing embodiments includes moving the airfoil from the first and second dies to a cooling chamber subsequent to the deforming step, walls of the cooling chamber twisted along a longitudinal axis of the cooling chamber between first and second end portions of the cooling chamber such that a perimeter of the cooling chamber at the first end portion is substantially offset from a perimeter of the cooling chamber at the second end portion, rotating the airfoil about the longitudinal axis between the first and second positions, and cooling the airfoil in the cooling chamber.

In a further embodiment of any of the foregoing embodiments, the cooling step includes conveying cooling flow to at least three separate and distinct cooling regions along the longitudinal axis of the cooling chamber such that a predefined temperature gradient is established between the first and second end portions.

The various features and advantages of this disclosure will become apparent to those skilled in the art from the following detailed description. The drawings that accompany the detailed description can be briefly described as follows.

DETAILED DESCRIPTION

Figure 1:
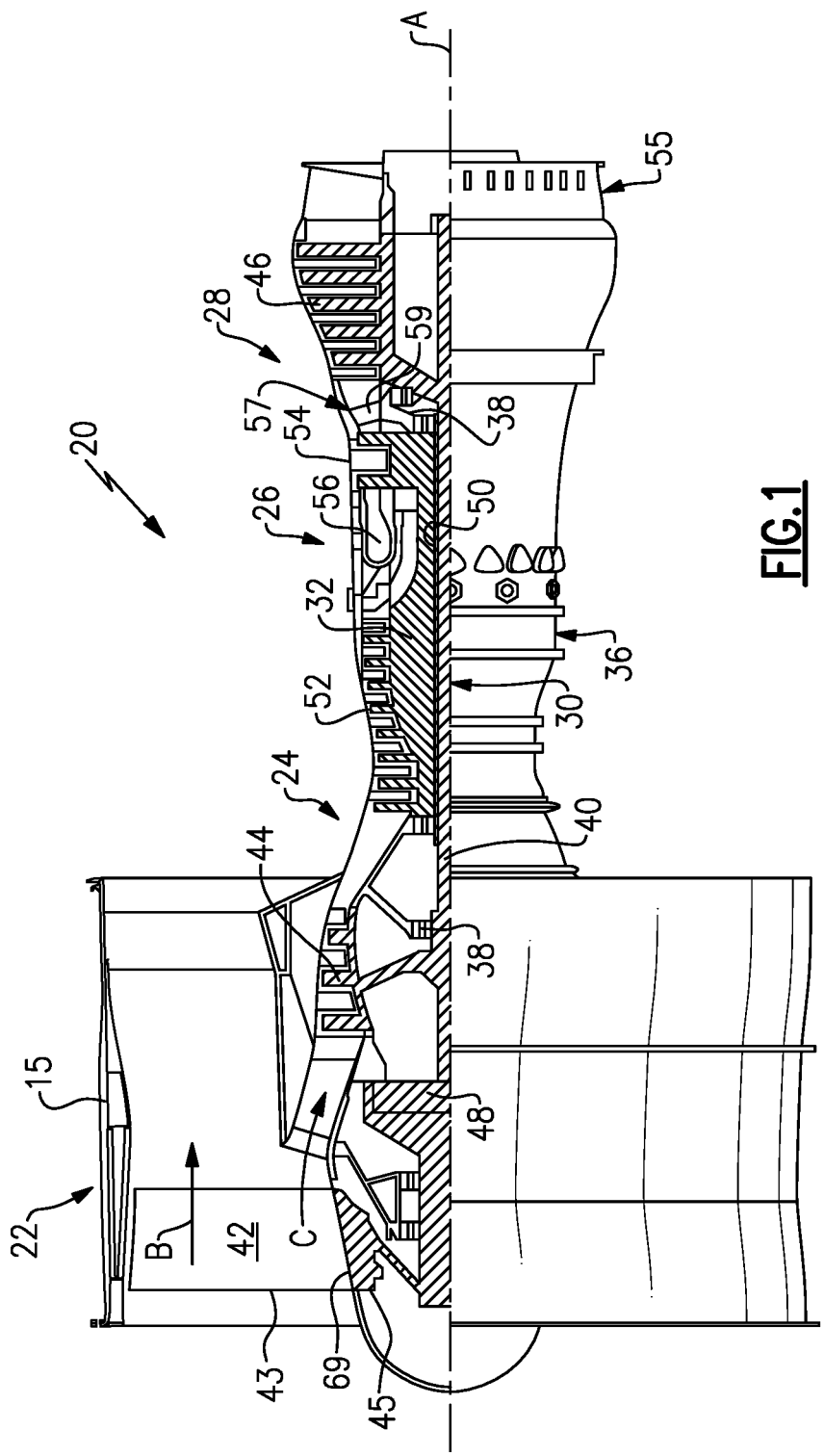
FIG. 1 illustrates an example turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

Figure 2:
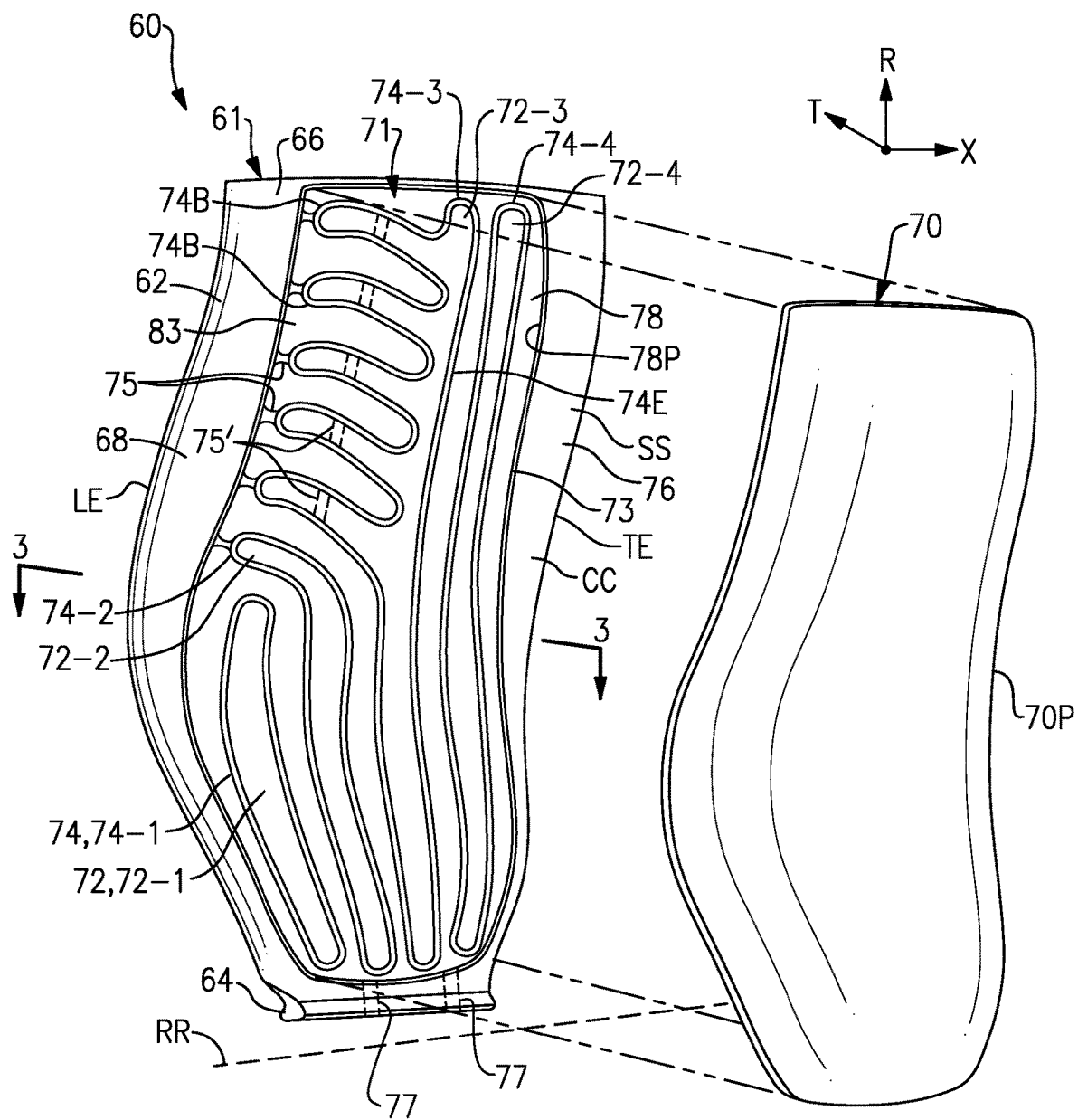
FIG. 2 illustrates a perspective view of a gas turbine engine component.

FIG. 2 illustrates a gas turbine engine component 60 according to an example. The component 60 can be incorporated in the gas turbine engine 20 of FIG. 1, for example. In the illustrated example of FIG. 2, the component 60 is an airfoil 61 such as a fan blade 43 of the fan 42. Other types of airfoils, including blades, vanes and struts in the fan, compressor and turbine sections 22, 24, 28, mid-turbine frame 57 and turbine exhaust case (TEC) 55 (FIG. 1) may benefit from the examples disclosed herein which are not limited to the design shown. Other parts of the gas turbine engine 20 may benefit from the examples disclosed herein, including industrial turbines.

The airfoil 61 includes an airfoil section 62 extending in a spanwise or radial direction R from a root section 64. The root section 64 is a shape that is configured to mount the fan blade 43 in the engine 20, such as a generally dovetail shape or geometry. The airfoil 61 is rotatable about an axis of rotation RR. The axis of rotation RR can be collinear or parallel to the engine axis A (FIG. 1). The root section 64 of each of the airfoils 61 is mountable to a rotatable hub, such as the rotatable hub 45 of the fan 42 of FIG. 1. The hub 45 is rotatable about the engine axis A to deliver airflow to the bypass and core flow paths B, C (FIG. 1). Generally, one side of the airfoil section 62 is a suction side SS and the other side is a pressure side PS (FIG. 3) separated in a thickness direction T. The pressure side PS has a generally concave profile, and the suction side SS has a generally convex profile. The airfoil section 62 extends in the thickness direction T between the pressure and suction sides PS, SS to define an aerodynamic surface contour CC of the airfoil section 62, as illustrated in FIG. 3.

The airfoil section 62 includes an airfoil (or main) body 68 that extends in the radial direction R from the root section 64 to a tip portion 66 (FIG. 2). The tip portion 66 establishes a terminal end of the airfoil 61. The airfoil body 68 extends in a chordwise direction X between a leading edge LE and a trailing edge TE. The airfoil body 68 extends between and defines at least one of the pressure and suction sides PS, SS. In the illustrated example of FIGS. 2 and 3, the airfoil body 68 defines both the pressure and suction sides PS, SS.

Figure 3:
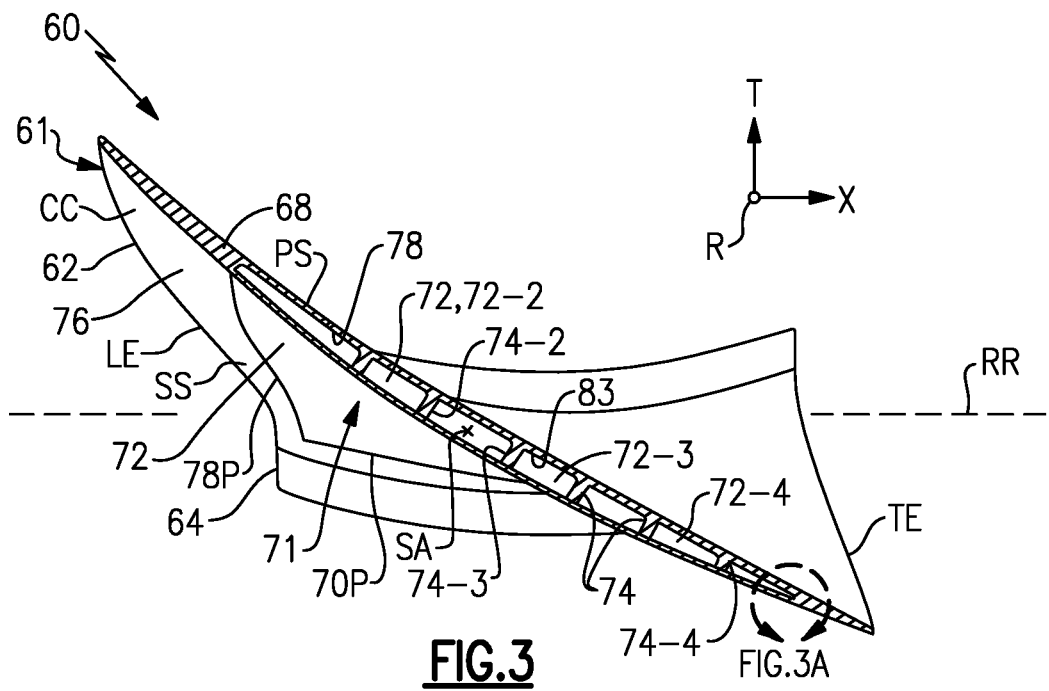
FIG. 3 illustrates a section view of the component taken along line 3-3 of FIG. 2.

The airfoil 61 includes a cover or cover skin 70 disposed on a surface of the airfoil body 68 and is arranged to provide a continuous surface with the suction side SS of the airfoil 61, as illustrated by FIG. 3. In another example, the cover skin 70 is disposed on the pressure side PS of the airfoil 61.

The cover skin 70 is shown in an uninstalled position in FIG. 2 for illustrative purposes. The component 60 can include two or more cover skins 70 along each of the pressure and/or suction sides PS, SS of the airfoil section 62.

The airfoil 61 including the airfoil body 68 and cover skin 70 can be made out of metallic materials such as titanium or aluminum. Other materials for the airfoil body 68 and cover skin 70 can be utilized, including metals or alloys and metal matrix composites.

Figure 3A:
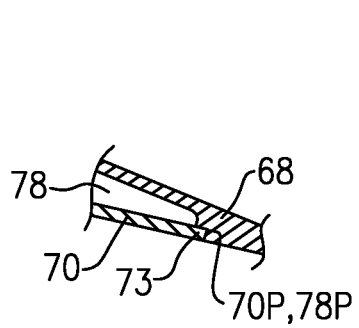
FIG. 3A illustrates selected portions of the airfoil of FIG. 3.

A sidewall 76 of the main body 68 defines a recessed region 78 that is dimensioned to at least partially receive the cover skin 70. The recessed region 78 extends inwardly from at least one of the pressure and suction sides PS, SS defined by the sidewall 76, such as the suction side SS as illustrated in FIGS. 2-3. The main body 68 defines a shelf 73 along a perimeter 78P of the recessed region 78, as illustrated by FIG. 2. The shelf 73 is dimensioned to at least partially receive and mate with a perimeter 70P of the cover skin 70, as illustrated in FIG. 3A.

The sidewall 76 of the airfoil body 68 includes a rib pattern 71 having one or more support ribs 74 that divide the recessed region 78 into, or otherwise define, a plurality of internal cavities or pockets 72 within the perimeter 78P of the recessed region 78 along the airfoil section 62. In the illustrated example of FIG. 2, the sidewall 76 defines four separate and distinct pockets 72 (indicated at 72-1 to 72-4) bounded by respective support ribs 74 within the perimeter 78P of the recessed region 78. The airfoil 61 can include fewer or more than four internal pockets 72, such as only one internal pocket 72. Each internal pocket 72 can be defined having different dimensions, shapes and at other orientations than illustrated in FIGS. 2 and 3. The internal pockets 72 can be substantially or completely free of any material such that the airfoil section 62 is hollow. The pockets 72 can serve to reduce an overall weight of the component 60. In other examples, the pockets 72 are at least partially filled with material, such as rubber-based damping material. The damping material can be inserted through one or more vent holes 77 (shown in dashed lines in FIG. 2 for illustrative purposes), following all elevated temperature processing.

The support ribs 74 are dimensioned to abut against and support adjacent portions of the cover skin 70. In the illustrative example of FIG. 2, the airfoil body 68 includes four ribs 74 (indicated at 74-1 to 74-4) distributed along the recessed region 78. Each rib 74-1 to 74-4 is dimensioned to substantially loop about and enclose a respective one of the internal pockets 72-1 to 72-4 within the perimeter 78P of the recessed region 78. The support ribs 74 can be spaced apart from each other and from the perimeter 78P of the recessed region 78. The substantially continuous, closed loop pockets 72 and ribs 74 decrease the unsupported areas of cover 70 which can increase the fatigue strength in the component 60.

The ribs 74 can have various shapes or profiles. For example, ribs 74-1 and 74-4 have a generally elongated, oblong or racetrack shaped geometry or profile. Rib 74-2 has a generally L-shaped geometry or profile. Other geometries can include a complex profile. In the illustrative example of FIG. 2, rib 74-3 has a generally serpentine geometry or profile having two or more (e.g., twelve) undulations of greater than 90 degrees in alternating directions that define one or more branched sections 74B extending from an elongated section 74E. Rib 74-3 includes five branched segments 74B establishing the serpentine profile, with the branched sections 74B each having a major component extending in the chordwise direction X from the elongated section 74E towards the leading edge LE. It should be appreciated that the rib pattern 71 can include serpentine ribs 74 having fewer or more than five branched segments 74B, such as six or seven branched segments 74B. Serpentine rib 74-3 is positioned between and dimensioned to space apart ribs 74-1, 74-2 from rib 74-4. The component 60 can include fewer or more than four ribs 74, and the ribs 74 can be defined having different dimensions, shapes and at other orientations than illustrated in FIG. 2. For example, at least some of the ribs 74 can have a generally circular, elliptical, rectangular and triangular geometries. The serpentine arrangement of rib 74-3 and the substantially continuous, closed loop pockets 72 disclosed herein can reduce stress concentrations in the component 60 and can minimize or otherwise reduce weld start/stop locations and weld distortion.

The cover skin 70 can be attached to the support ribs 74 utilizing any of the techniques disclosed herein, including electron beam welding, laser welding, brazing, diffusion bonding or other fastening techniques. For example, the cover skin 70 can be welded to the airfoil body 68 along the support rib(s) 74 and/or the perimeter 78P to enclose the recessed region 78.

The rib pattern 71 can include a plurality of stiffening ribs 75 (FIG. 2) defined in the main body 68. The stiffening ribs 75 extend from the support ribs 74 and/or perimeter 78P of the recessed region 78. In the illustrative example of FIG. 2, the stiffening ribs 75 are generally linear or curvilinear and interconnect the support ribs 74 with the perimeter 78P of the recessed region 78. One or more stiffening ribs 75 can extend between opposed walls of the respective support rib 74, as illustrated by ribs 75' (shown in dashed lines in FIG. 2 for illustrative purposes).

Figure 3B:
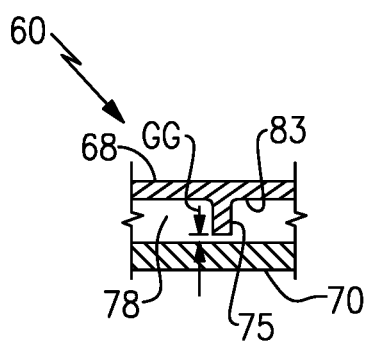
FIG. 3B illustrates a section view of a stiffening rib within the component of FIG. 3.

The stiffening ribs 75 are dimensioned to extend outwardly from a floor 83 of the recessed region 78, and at least some of the stiffening ribs 75 can be spaced apart from the cover skin 70 to define a gap GG when in an assembled position, as illustrated by rib 75 of FIG. 3B. The stiffening ribs 75 can serve to provide rigidity or stiffening to the main body 68, and can be dimensioned to allow the main body 68 to flex to absorb impacts from foreign objection debris (FOD), which can reduce strain along weld joints between the ribs 74 and cover skin 70. In other examples, the stiffening ribs 75 are omitted.

Figure 4:
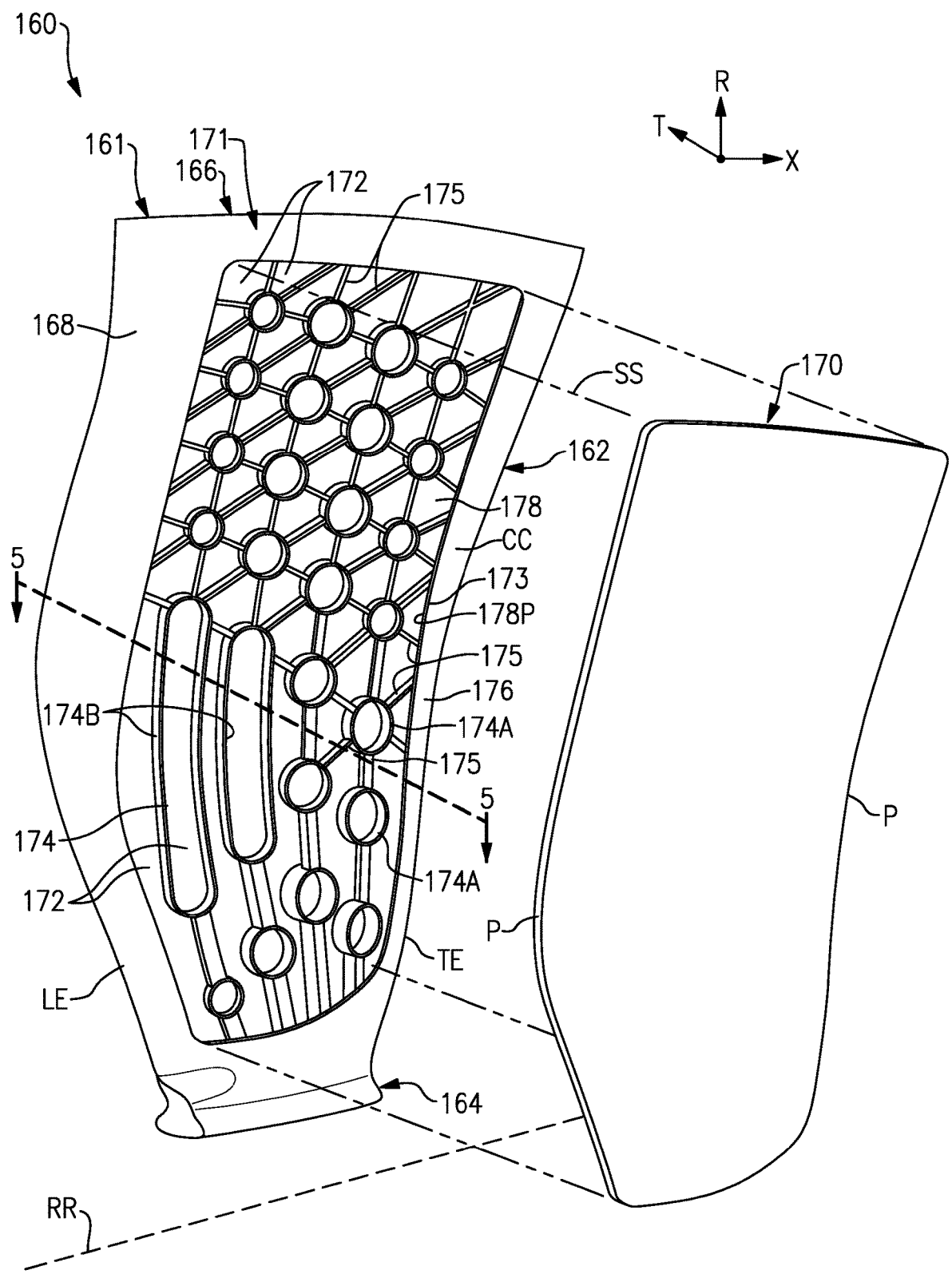
FIG. 4 illustrates a perspective view of a gas turbine engine component according to another example.
Figure 5:
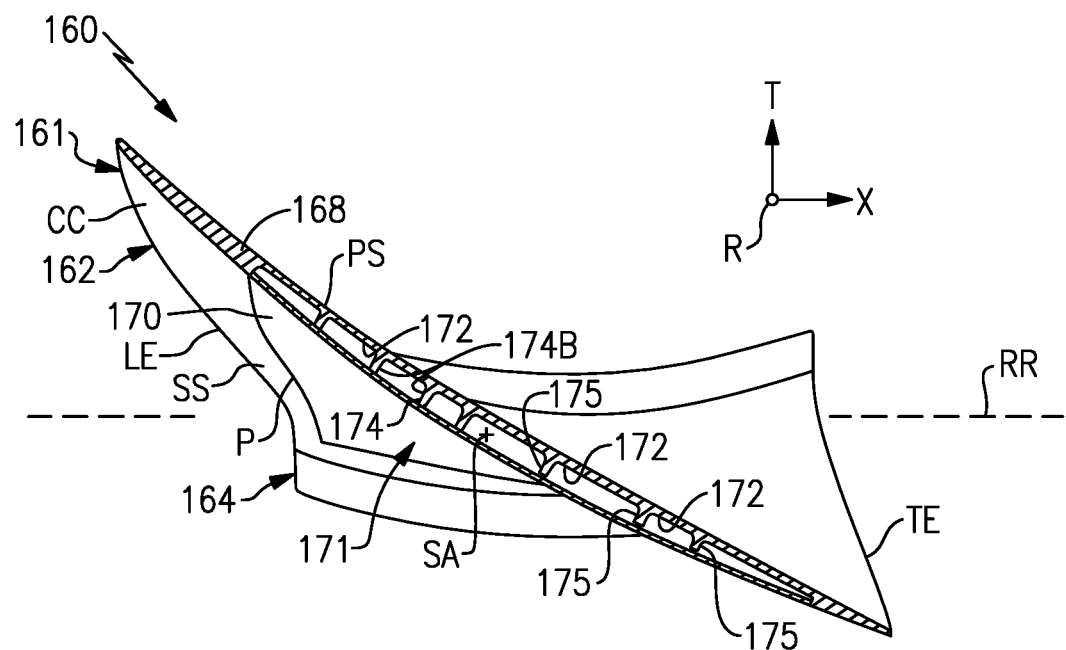
FIG. 5 illustrates a section view of the component taken along line 5-5 of FIG. 4.

FIGS. 4-5 illustrate a gas turbine engine component 160 according to another example. In this disclosure, like reference numerals designate like elements where appropriate and reference numerals with the addition of one-hundred or multiples thereof designate modified elements that are understood to incorporate the same features and benefits of the corresponding original elements. The component 160 includes a rib pattern 171 including support ribs 174 and stiffening ribs 175. In the illustrated example of FIG. 4, ribs 174A have a generally circular or otherwise elliptical geometry, and ribs 174B have generally elongated, oblong or racetrack shaped geometry. Stiffening ribs 175 are generally linear or curvilinear. Ribs 174A, 174B can be attached to cover skin 170 utilizing any of the techniques disclosed herein. At least some of the stiffening ribs 175 can be spaced apart from the cover skin 170, as illustrated by ribs 175 of FIG. 5.

Figure 6:
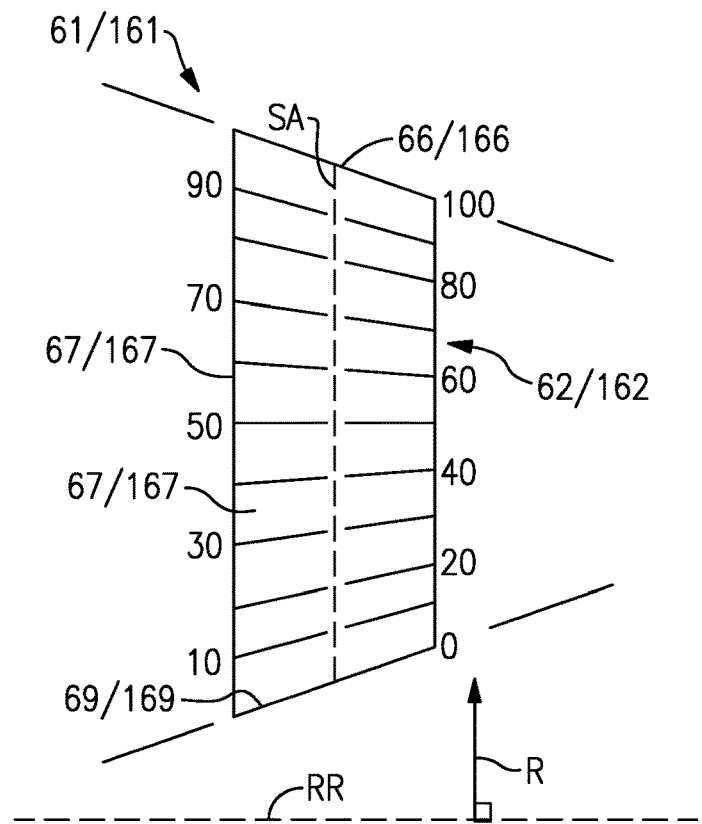
FIG. 6 is a schematic view of airfoil span positions.

Referring to FIG. 6, span positions of the airfoil section 62/162 are schematically illustrated from 0% to 100% in 10% increments to define a plurality of sections 67/167. Each section 67/167 at a given span position is provided by a conical cut that corresponds to the shape of segments a flowpath (e.g., bypass flowpath B or core flow path C of FIG. 1), as shown by the large dashed lines. In the case of an airfoil 61/161 such as with an integral platform 69/169, the 0% span position corresponds to the radially innermost location where the airfoil section 62/162 meets the fillet joining the airfoil 61/161 to the platform 69/169 (see also FIG. 1 illustrating platform 69). In the case of an airfoil 61/161 without an integral platform, the 0% span position corresponds to the radially innermost location where the discrete platform 69/169 meets the exterior surface of the airfoil section 62/162. A 100% span position corresponds to a section of the airfoil section 62/162 at the tip portion 66/166.

Figure 7:
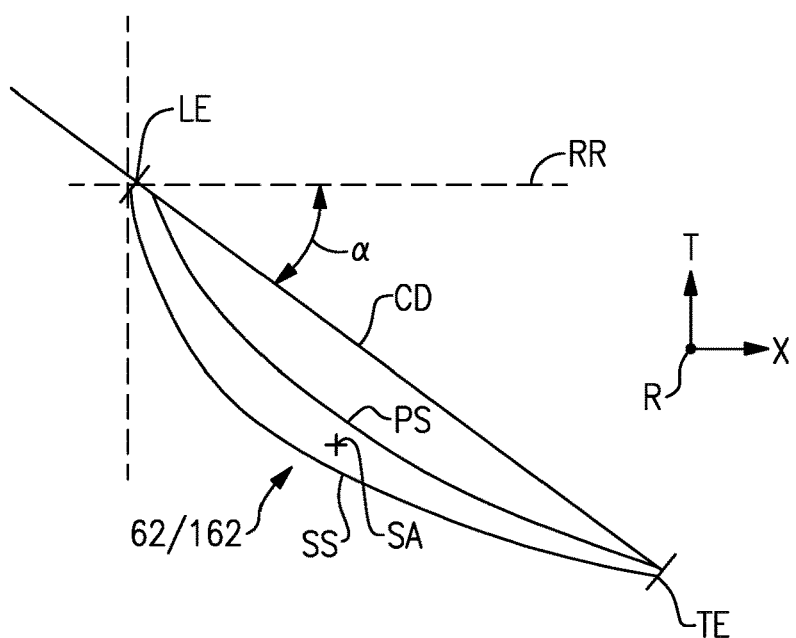
FIG. 7 is a schematic view of an airfoil depicting a stagger angle at a span position of FIG. 6.

Referring to FIG. 7, with continuing reference to FIG. 6, the airfoil section 62/162 is sectioned at a radial position between the root section 64/164 and tip portion 66/166. In examples, each airfoil section 62/162 is specifically twisted about a spanwise axis SA (see also FIGS. 3 and 5) in the radial direction R with a corresponding stagger angle α at each span position. The spanwise axis SA can have a major component that extends in the spanwise or radial direction R. Chord CD, which is a length between the leading and trailing edges LE, TE, forms the stagger angle α relative to the chordwise direction X or a plane parallel to the axis or rotation RR.

The stagger angle α can vary along the span of the airfoil section 62/162 to define a twist. The airfoil section 62/162 can be three-dimensionally twisted about the spanwise axis SA. For example, the tip portion 66/166 can define a stagger angle α relative to the root section 64/164 that is greater than or equal to 5 degrees or 10 degrees, absolute. In examples, the tip portion 66/166 defines a stagger angle α relative to the root section 64/164 that is greater than or equal to 15 degrees, absolute. In some examples, the stagger angle α at the tip portion 66/166 relative to the root section 64/166 is between 5-60 degrees, absolute, or more narrowly between 10-30 degrees, absolute, such that the airfoil section 62/162 is twisted about the spanwise axis SA as illustrated by the airfoils 61, 161 of FIGS. 3 and 5.

Figure 8:
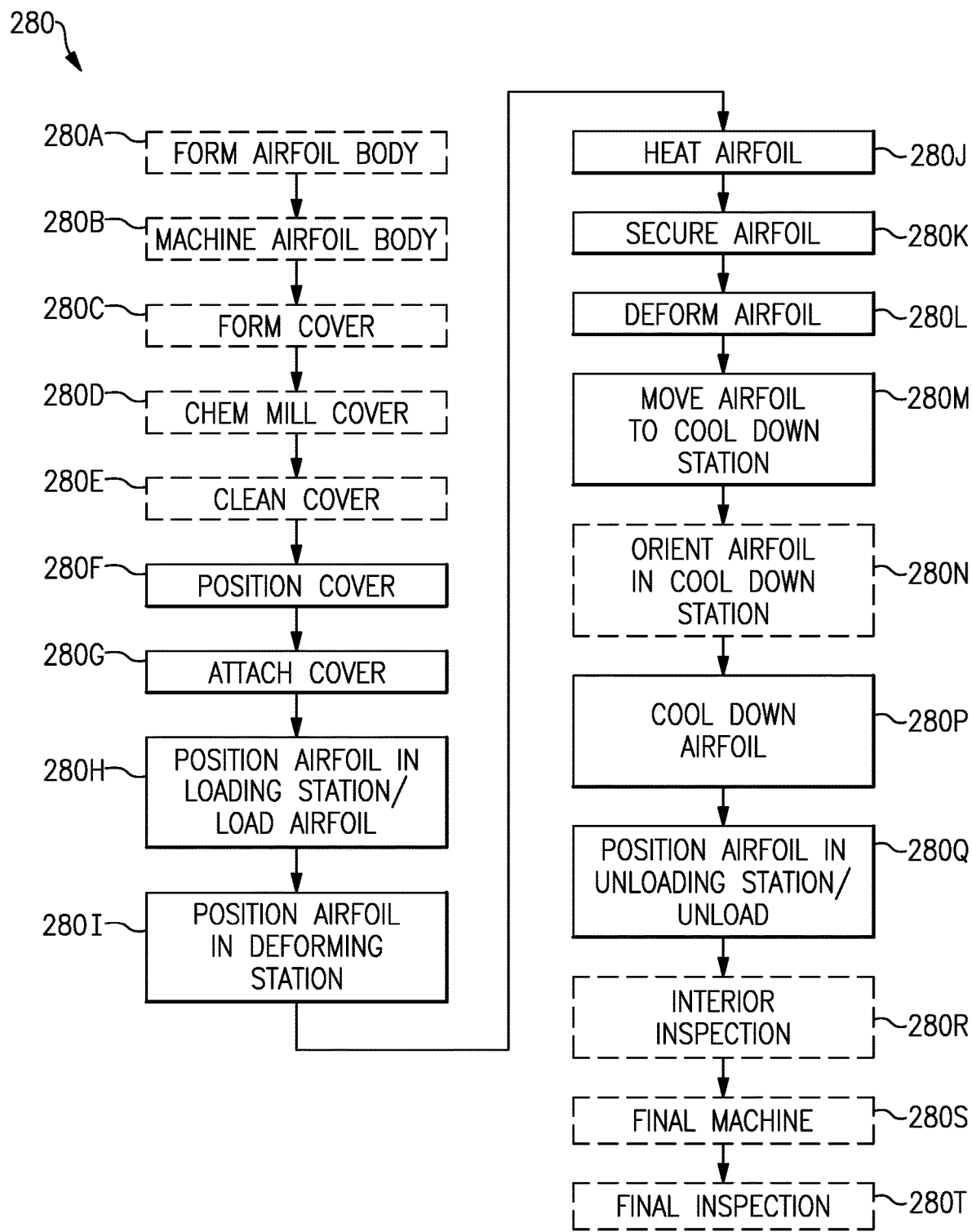
FIG. 8 illustrates a process for forming a component.

FIG. 8 illustrates a process of constructing or forming a component in a flow chart 280. The process 280 can be utilized to form a gas turbine engine component, including a hollow component such as the airfoils 61/161 of FIGS. 2-5, the fan blades 43 of engine 20, another component such as a solid airfoil, or another component of the engine 20 including static vanes and struts, for example. Reference is made to the component 260 of FIGS. 9-11, 12A-12B and 15A-15C for illustrative purposes, which disclose exemplary conditions or states of the component 260 in the process 280. In the illustrative example of FIGS. 9-11, 12A-12B and 15A-15C, the component 260 is a hollow airfoil 261 or fan blade including a metallic airfoil section 262. The techniques disclosed herein can be utilized to form a new component or to repair a previously fielded component.

Figure 9:
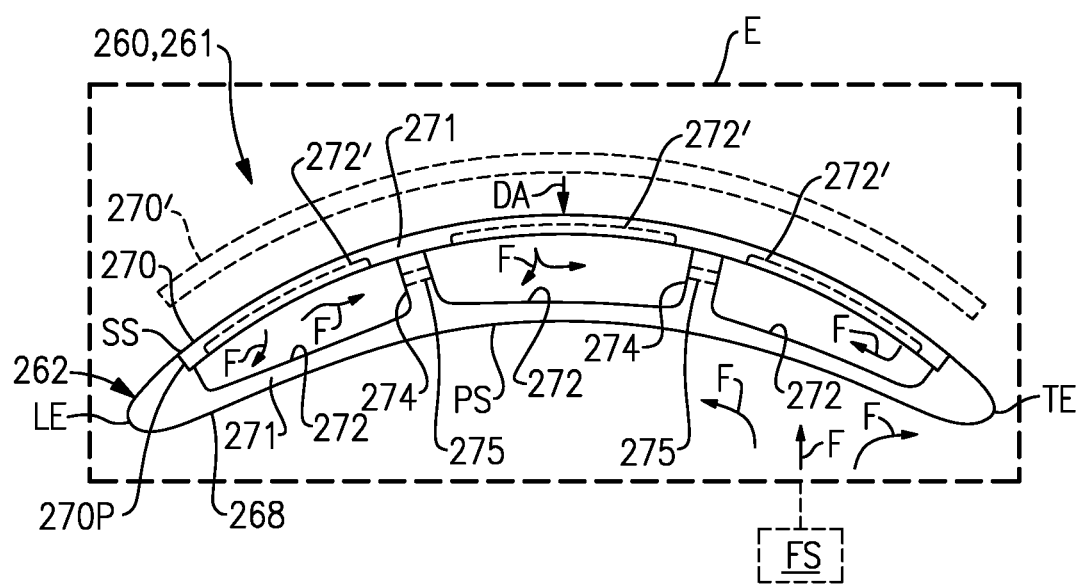
FIG. 9 illustrates attachment of portions of a component.

Referring to FIGS. 8 and 9, one or more portions of the component 260 can be prepared or otherwise provided at steps 280A-280E (shown in dashed lines). The component 260 includes a first skin or airfoil/main body 268 and a cover (or second) skin 270 that define one or more walls 271 of the component 260.

At step 280A, the main body 268 is formed with respect to a predefined blade geometry, which can be defined with respect to one or more design criteria. The main body 268 can be forged, cast, or produced by additive manufacturing from a metal or metal alloy, for example. At step 280B, internal and/or external surfaces of the main body 268 are machined with respect to the predefined blade geometry. At step 280C, cover skin 270 is hot formed with respect to a predefined cover geometry. The cover skin 270 can be formed from sheet metal, for example. The main body 268 and cover skin 270 can be machined and hot formed, respectively, to a configuration that compensates for weld distortion such that upon entering deform machine 286 (FIGS. 12A-12B) no more than a 1 or 2 degree change in the stagger angle α is required or otherwise occurs. At step 280D, the cover skin 270 is chemically milled with respect to the predefined cover geometry. At step 280E, the cover skin 270 is cleaned to remove surface contaminants using a laser cleaning technique, for example.

One or more internal cavities 272 are formed in the main body 268 and/or the cover skin 270 (internal cavities 272' defined in cover skin 270 shown in dashed lines for illustrative purposes). Ribs 274 can be arranged to define various geometries of the internal cavities 272, including any of the geometries of the ribs 74, 174 of FIGS. 2 and 4.

Various techniques can be utilized to form the internal cavities 272, including casting, machining or additive manufacturing techniques. The internal cavities 272 can be defined in the main body 268 and/or cover skin 270 during steps 280A-280C, for example. The cover skin 270 is dimensioned to enclose at least one, or more than one, internal cavity 272 in the main body 268 when in an installed position.

At step 280F, cover skin 270' is positioned relative to the main body 268. Cover skin 270' is shown in dashed lines in FIG. 9 at a distance away from the main body 268 for illustrative purposes. The positioning can include moving the cover skin 270' in a direction DA and into abutment with ribs 274 of the main body 268 to define a pre-finished state of the airfoil section 262, as illustrated by cover skin 270.

At step 280G, the cover skin 270 is attached to the main body 268 to define the airfoil 261. The main body 268 and cover skin 270 cooperate to establish pressure and suction sides PS, SS of the airfoil 261. In examples, at least a perimeter 270P of the cover skin 270 and/or locations of the cover skin 270 abutting the ribs 274 are attached to the main body 268 to enclose or otherwise bound one or more internal cavities 272 between the main body 268 and cover skin 270. Various techniques can be utilized to attach the cover skin 270 to the main body 268, including laser or electron beam welding, brazing, diffusion bonding or other fastening techniques. The predefined blade and cover geometries can be set with respect to an expected distortion in the airfoil 261 caused by attachment of the main body 268 and cover skin 270 during the attaching step 280G.

The airfoil body 268 can extend from a root section to a tip portion (e.g., root section 64/164 and tip portion 66/166 of FIGS. 2 and 4) to define a stagger angle α (FIG. 7) such that the airfoil body 268 is twisted. Step 280G can include welding or otherwise attaching the cover skin 270 to the main body 268 to define the airfoil 261 such that the main body 268 is twisted along the spanwise axis SA to define the stagger angle. The stagger angle of the airfoil section 262 can include any of the stagger angles disclosed herein, such as being greater than or equal to 10 degrees, absolute, at the airfoil tip relative to the root section prior to attaching the cover skin 270 at step 280G.

Attaching the cover skin 270 can include trapping an inert gas in each internal cavity 272. In the illustrated example of FIG. 9, the component 260 can be situated in a controlled environment E (shown in dashed lines) prior to and during the attaching step 280G. A fluid source FS (shown in dashed lines) is operable to convey an amount of fluid F to the environment E. Example fluids F include inert gases such as argon, $CO_2$ or helium. The fluid F circulates in the environment E and is communicated to the internal cavities 272.

Attaching the cover skin 270 to the airfoil body 268 can cause an amount of the fluid F to be trapped in the internal cavities 272. In other examples, fluid F is communicated to the internal cavities 272 via passages in the root section (see, e.g., passages or vent holes 77 of FIG. 2). Walls of the ribs 274 can include one or more vent holes 275 (shown in dashed lines) at approximately mid-point within the rib 274, for example, to facilitate equalization of pressure of the trapped inert gases between adjacent internal cavities 272 during attaching step 280G.

Figure 10:
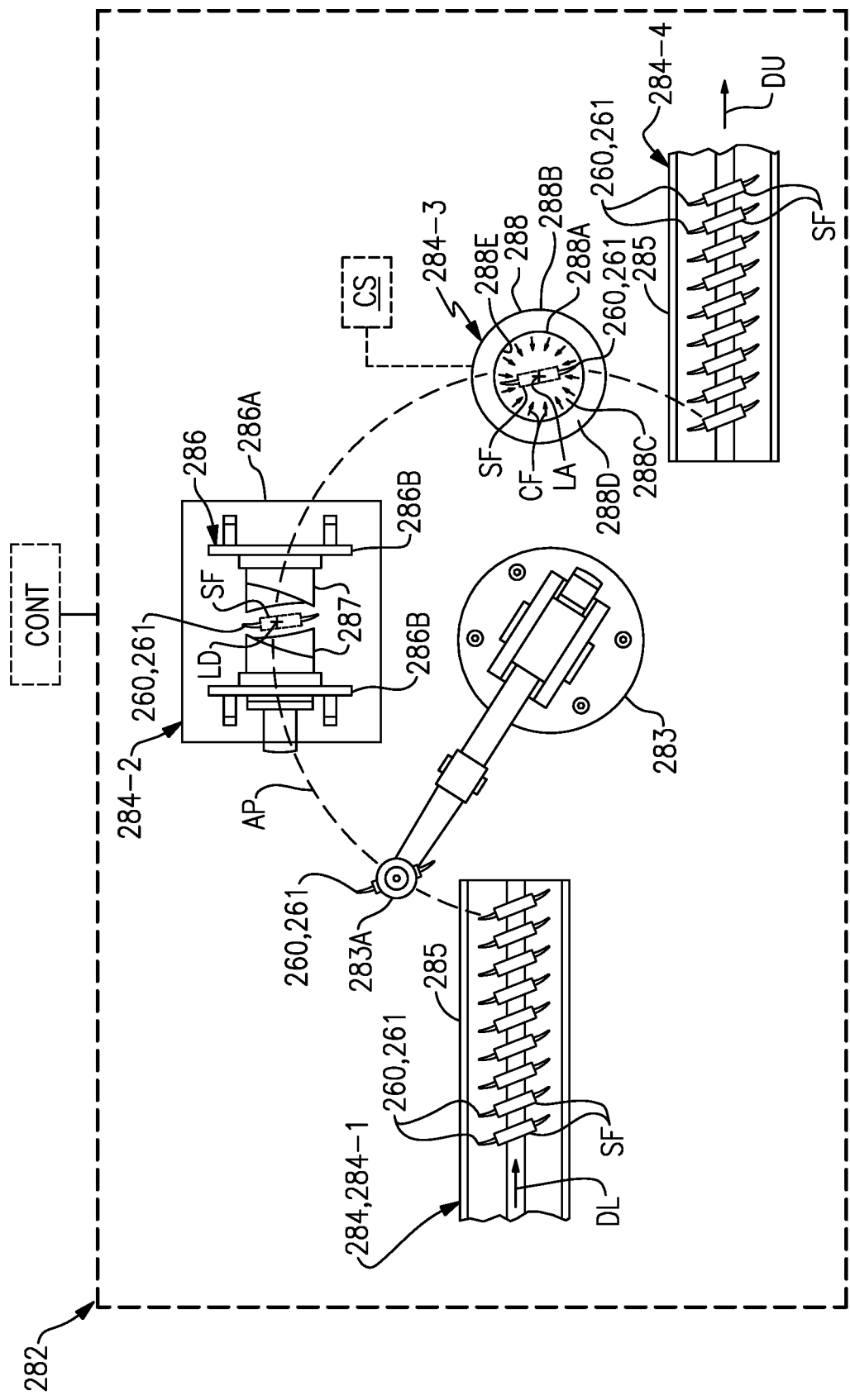
FIG. 10 illustrates a forming line including gas turbine engine components positioned in a plurality of stations.

FIG. 10 illustrates an automated forming line 282 that can be utilized with the exemplary process 280 to form the component(s) 260 with respect to a predefined geometry, such as the airfoil section 262 of FIG. 9, or the airfoil sections 62, 162 of components 60, 160, for example. However, other components can be utilized according to the teachings disclosed herein, such as vanes and endwalls.

The forming line 282 includes a plurality of stations 284. In the illustrative example of FIG. 10, the forming line 282 includes four stations 284 (indicated at 284-1 to 284-4). Each of the stations 284 can be separate and distinct from one another. It should be understood that fewer or more than four stations 284 can be utilized in accordance with the teachings disclosed herein, and any of the stations 284 can be combined or separated to provide the functionality of the process 280. Each station 284 can be an "open air" or non-vacuum environment, which can reduce a complexity of forming the components 260. The open air environment can exclude any furnace or protective environment such as a vacuum or argon environment.

The stations 284 includes at least a loading station 284-1, a deforming station 284-2, a cool down station 284-3, and an unloading station 284-4. The loading station 284-1 is upstream of the deforming station 284-2. The deforming station 284-2 is upstream of the cool down station 284-3. The cool down station 284-3 is upstream of the unloading station 284-4. The loading and unloading stations 284-1, 284-4 can include conveyors 285 moveable in respective directions DL, DU to move or position the components 260 in each of the stations 284-1, 284-4.

The forming line 282 can include a controller CONT (shown in dashed lines) operable to index, move or position the component(s) 260 in and through each of the stations 284 according to a predefined schedule. One would understand how to configure the controller CONT with logic to execute the predefined schedule according to the teachings disclosed herein. The forming line 282 can include at least one robot 283 operable to position or otherwise move each of the components 260 between the stations 284 in response to the controller CONT. The robot 283 includes an articulated head assembly 283A extending from an overhung arm configured to carry at least one component 260. An exemplary robot that can be utilized in the forming line 282 is made by ABB Robotics®. It should be appreciated that other techniques for moving the components 260 can be utilized including, but not limited to, manually positioning the components 260 in each station 284.

Figure 11:
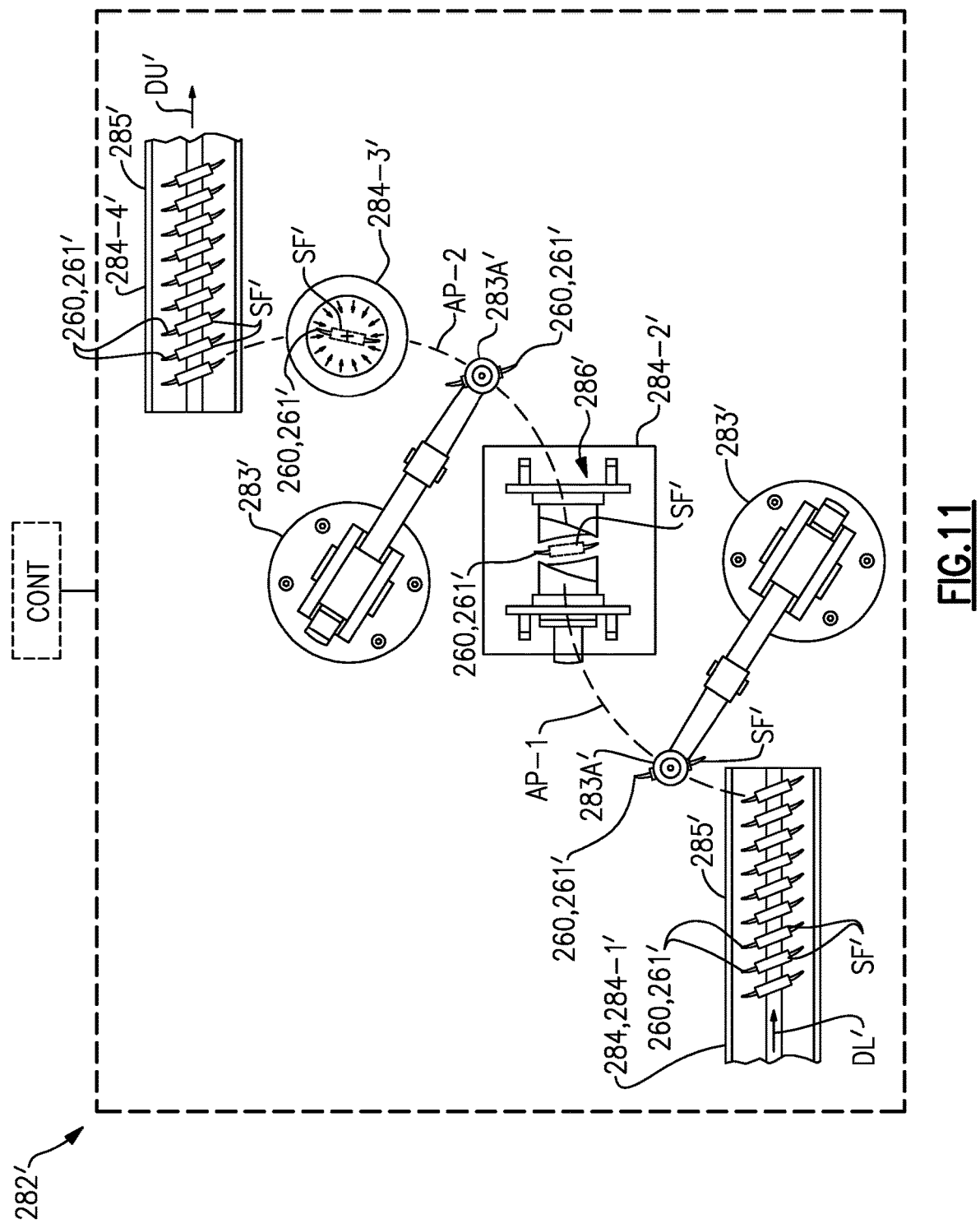
FIG. 11 illustrates a forming line according to another example.

The robot 283 can be configured such that the head assembly 283A moves along a substantially arcuate path AP (shown in dashed lines) between the stations 284-1 to 284-4. In the illustrative example of FIG. 11, forming line 282' includes at least two robots 283'. Robots 283' are configured such that the head assembly 283A' of one of the robots 283' moves along a first substantially arcuate paths AP-1 between stations 284-1' and 284-2' and such that the head assembly 283A' of another one of the robots 283' moves along a second substantially arcuate path AP-2 between stations 284-2', 284-3' and 284-4' such that the arc paths AP-1, AP-2 together have a generally S-shaped profile as illustrated in FIG. 11. However, it should be appreciated that the components 260 can be moved between the stations 284 along paths having non-arcuate geometries. Movement of the robots 283' can be synchronized or coordinated such that one of the robots 283' positions another component 260 in the deforming station 282-2' once a previous component 260 is moved from the deforming station 282-2' towards the cool down station 284-3', which can improve throughput of the forming line 282'.

Referring to FIG. 10 with continuing to reference to FIG. 8, at step 280H one or more components 260 having airfoils 261 can be placed or positioned in the forming line 282 at the loading station 284-1 subsequent to the attaching step 280G. The airfoil 261 can be positioned in a root upward orientation in a support fixture SF (shown in dashed lines) as illustrated by the airfoil 261 and respective root sections 264 of FIG. 12A, for example. Each conveyor 285 can be an overhead conveyer operable to move the component 260 together with the support fixture SF in the stations 284-1 and 284-4. Each robot 283 is operable to move the component 260 together with the support fixture SF between the stations 284.

The components 260 can be placed in a queue in the loading station 284-1, as illustrated in FIG. 10. The components 260 are moved or positioned in the loading station 284-1 at a loading temperature. The loading temperature can be above 32 degrees Fahrenheit (F), such as between 50 degrees and 150 degrees Fahrenheit (F). In some examples, the loading temperature can be set to approximately room temperature. For the purposes of this disclosure, the term "room temperature" means a temperature between 68 degrees and 73 degrees Fahrenheit (F) and the terms "approximately" and "substantially" mean±3% of the value unless otherwise disclosed.

Figure 12A:
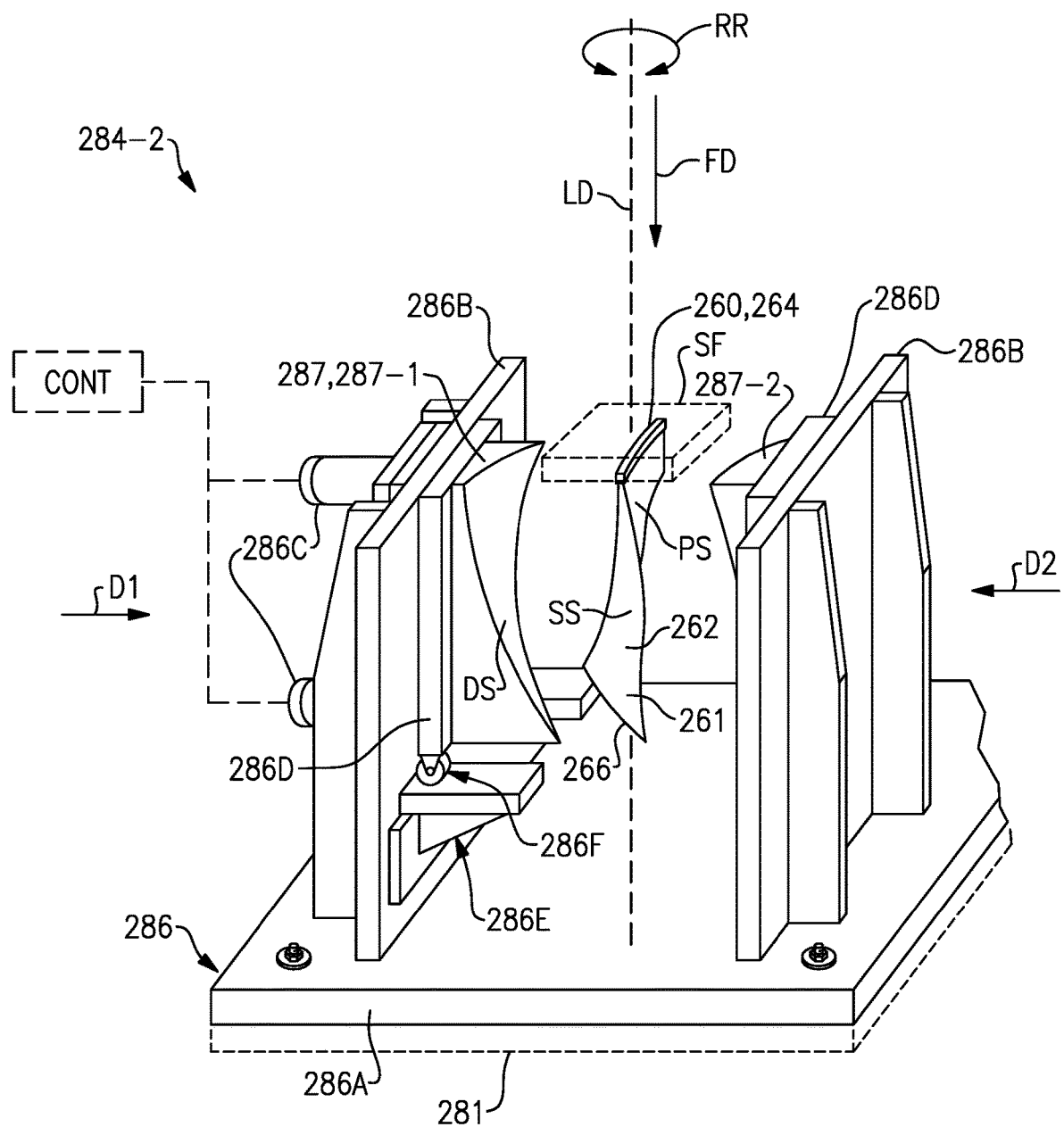
FIG. 12A illustrates a perspective view of the component of FIG. 9 positioned in a deforming station including a set of dies.
Figure 12B:
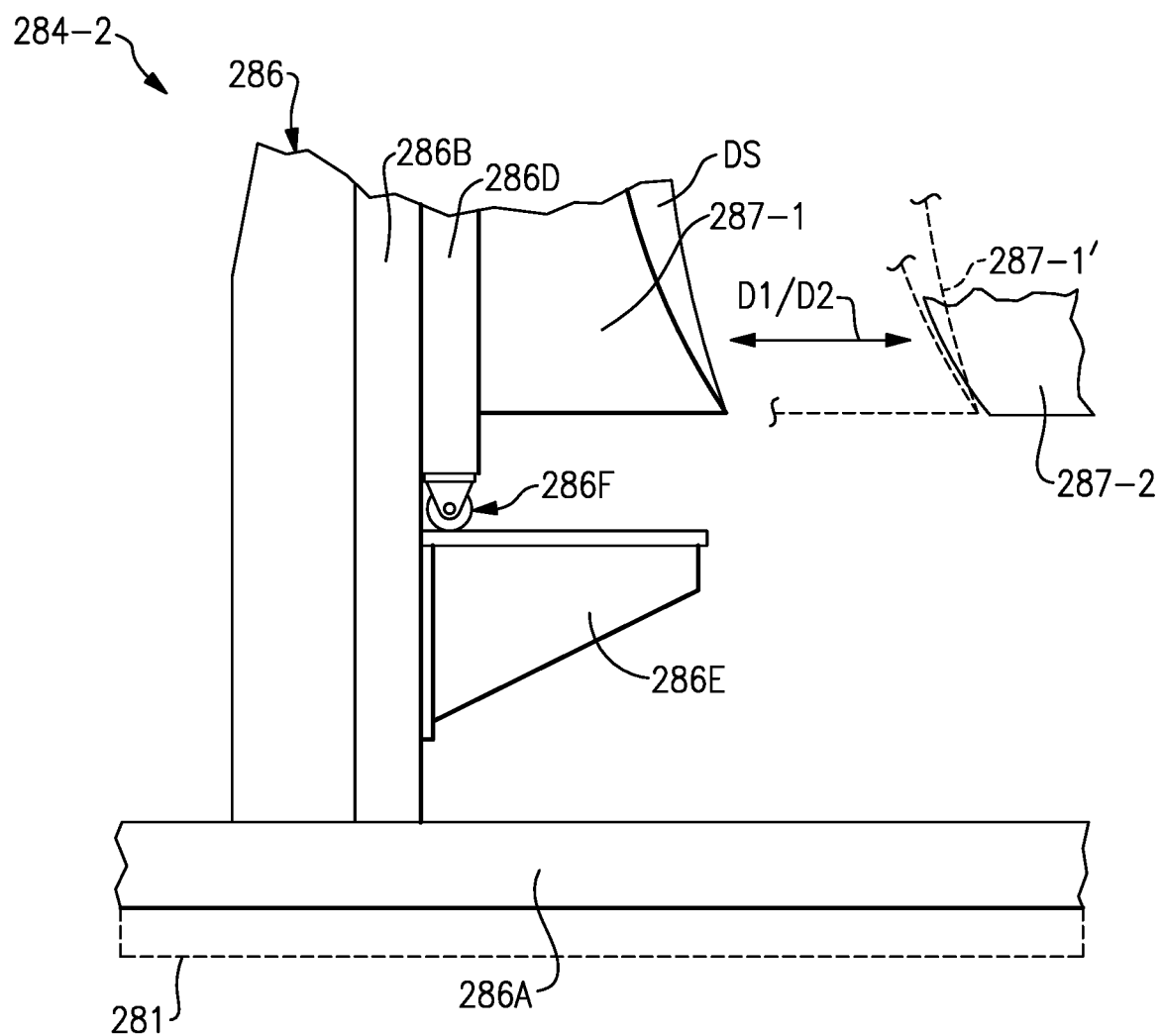
FIG. 12B illustrates a side view of the deforming station of FIG. 12B.

Referring to FIG. 12A, with continuing reference to FIGS. 8 and 10, the component 260 is positioned in a deforming machine 286 of the deforming station 284-2 at step 280I. Step 280I can include causing the robot 283 to move one of the components 260 from the loading station 284-1 along the arcuate path AP to the deforming machine 286.

The deforming machine 286 is operable to permanently deform at least a portion of the component 260 such as the airfoil section 262. The deforming machine 286 includes a base 286A mounted to a static structure 281 (shown in dashed lines for illustrative purposes). The static structure 281 may be a factory floor, for example, utilizing one or more fasteners. The machine 286 includes a pair of structural supports 286B extending from and fixedly attached or otherwise secured to the base 286A. The structural plates 286B have a generally rectangular geometry and extend substantially perpendicular to the base 286A such that the structural plates 286B oppose each other.

Figure 13:
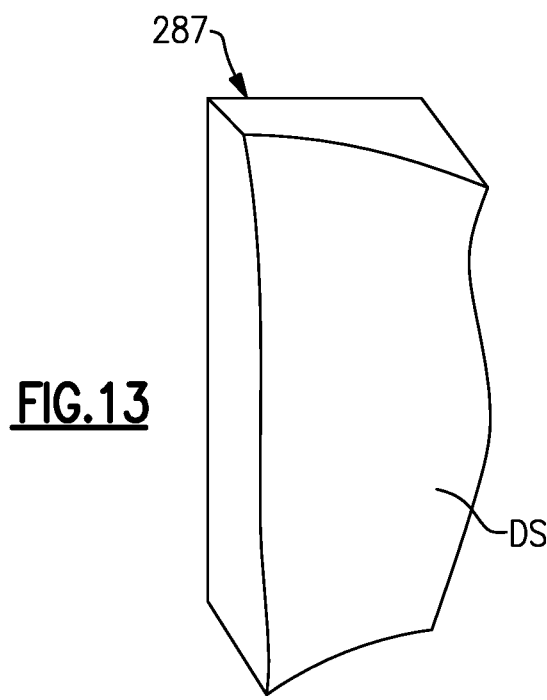
FIG. 13 illustrates a die according to an example.

The machine 286 includes a set of first and second dies (or die halves) 287 (indicated at 287-1, 287-2) and a set of mounting plates 286D. The machine 286 includes one or more actuators 286C (e.g., one pair) coupled to at least one of the mounting plates 286D, as illustrated in FIG. 12A. The dies 287-1, 287-2 are fixedly attached or otherwise secured to the mounting plates 286D such that the dies 287-1, 287-2 oppose each other. The dies 287-1, 287-2 include respective die surfaces DS (FIGS. 12A-12B and 13) dimensioned with respect to a predefined contour of the component 260. The die surfaces DS are dimensioned according to respective portions of the predefined contour. In examples, the die surfaces DS are contoured to respectively mate with pressure and suction sides PS, SS of the airfoil 261, as illustrated by the die surface DS of FIG. 13.

The machine 286 can include gusseted supports or shelves 286E extending outwardly from the structural plates 286B. In the illustrative example of FIGS. 12A-12B, rollers 286F are fixedly attached to a bottom of each mounting plate 286D to support the mounting plate 286D on the shelf 286E. At least one of the dies 287 such as die 287-1 is movable in opposed directions D1, D2 between a first position and a second position (indicated by dashed lines at 287-1' in FIG. 12B for illustrative purposes) in response to movement of the mounting plate 286D relative to the respective shelf 286E.

Step 280I can include suspending or otherwise supporting the airfoil 261 in a vertical direction by the root section 264 from the support fixture SF (shown in dashed lines) residing above deforming machine 286. The component 260 is omitted from FIG. 12B for illustrative purposes. Step 280I can include moving the component 260 in a direction FD along die axis LD (FIGS. 10 and 12A) such that the airfoil 261 is positioned and oriented substantially vertically between the dies 287-1, 287-2 with the tip portion 266 positioned downward or otherwise below the root section 264, as illustrated in FIG. 12A. Direction FD can have a major component that extends in the vertical direction relative to the base 286A of the deforming machine 286. A major component of the die axis LD can extend in the vertical direction or can extend in the horizontal direction, for example. Vertically orienting the airfoil 261 by hanging or suspending the airfoil 161 by the root section 264 can reduce spanwise distortions such as buckling during heating and cooling of the airfoil 261.

In examples, step 280I includes simultaneously axially translating the airfoil 261 along the die axis LD and rotating the airfoil 261 in the direction RR about the die axis LD at least while the airfoil 261 is at least partially axially aligned with the dies 287 relative to the die axis LD such that a proper distance between the airfoil 261 and surfaces of the dies 287 is maintained. Simultaneously axially translating and rotating the airfoil 261 between the dies 287 can reduce a clearance or first distance DD1 (FIG. 15A) between the dies 287 sufficient to receive the airfoil 261 from approximately 15 inches to approximately 4 inches for an airfoil having a stagger angle of approximately 60 degrees, which may improve cycle times due to a reduced likelihood of temperature decreases of the dies 287 while in an open position and increased recovery times for the dies 287 to reach the predefined temperature for deformation during step 280L.

Figure 14:
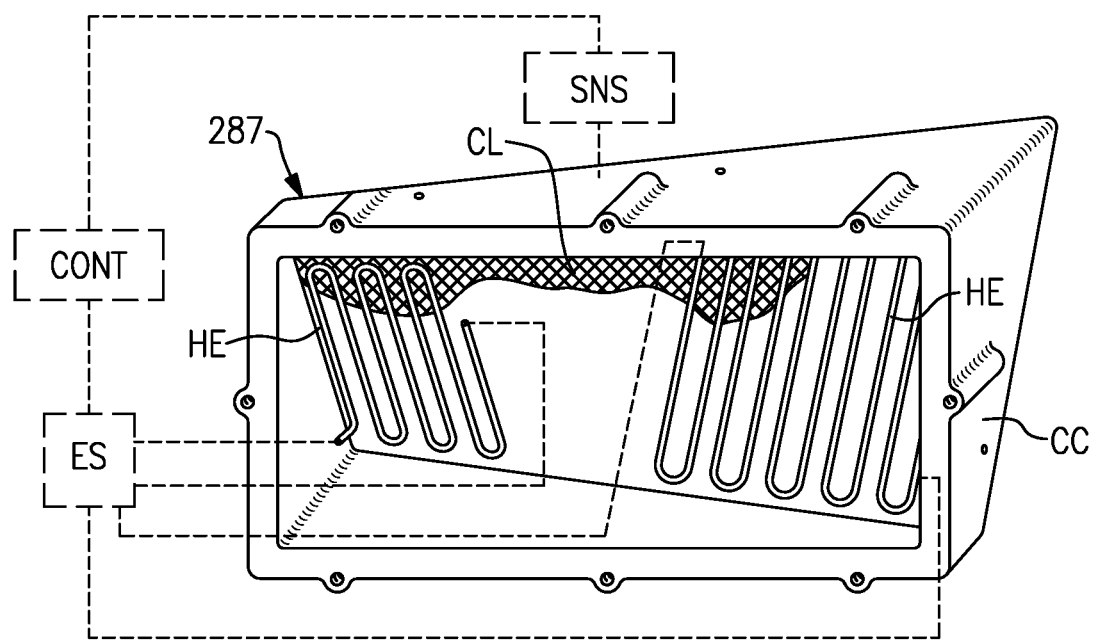
FIG. 14 illustrates a perspective view of one of the dies of FIG. 12A.

FIG. 14 illustrates a backside of a refined version one of the dies 287. Each die 287 can include one or more heating elements HE positioned in a backside cavity of the die 287. Each die 287 can be made of metal or a metal alloy, such as a cast nickel alloy which can improve the ability of continuously operating the dies 287 at a predefined temperature threshold or range, including any of the thresholds disclosed herein.

Each heating element HE can be a heating coil that is coupled to an energy source ES (shown in dashed lines). The energy source ES can be a power supply operable to communicate electrical current to the heating element HE in response to controller CONT to heat the respective die 287 to the predefined temperature threshold. The controller CONT can be coupled to at least one sensor SNS (shown in dashed lines), such as a thermocouple, to monitor surface temperatures of the respective die 287. The controller CONT is operable to adjust the temperature of the die 287 to maintain, approach or exceed the predefined temperature threshold.

A non-metallic heat conductive layer CL such as combustible resistant cloth can be situated between the heating elements HE and surfaces of the die 287 to reduce a likelihood of arcing. At least one coating CC can be deposited on surfaces of the die 287. Example coatings include diffused aluminide which can provide oxidation protection.

Figure 15A:
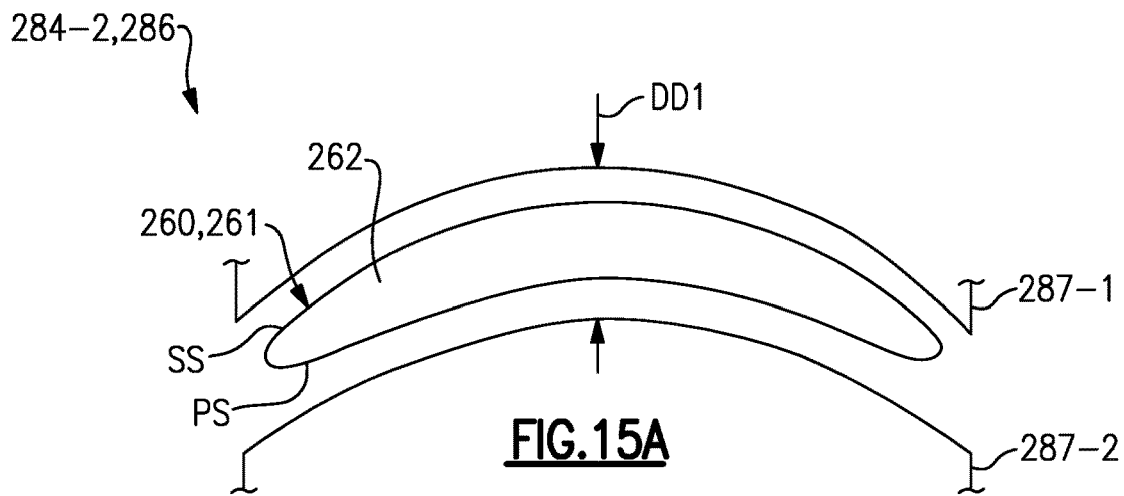
FIG. 15A illustrates the component of FIG. 9 in a first position relative to the dies of FIG. 12A.
Figure 15B:
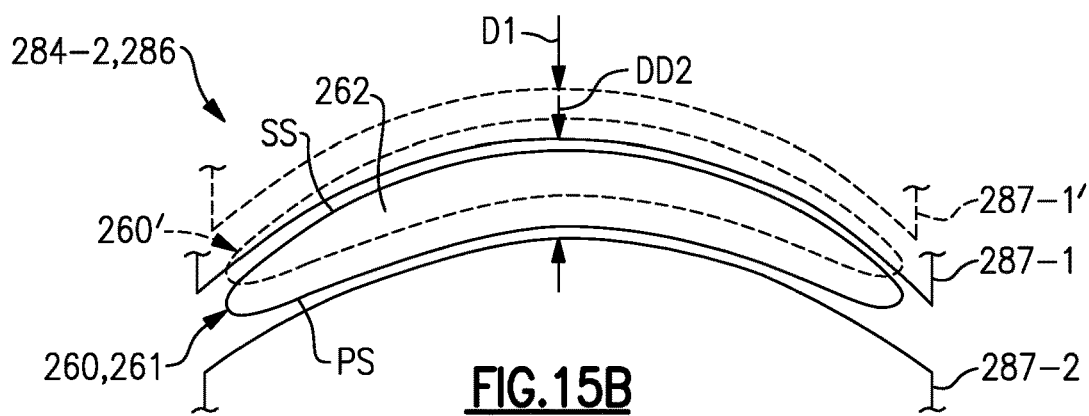
FIG. 15B illustrates the component of FIG. 9 in a second position relative to the dies of FIG. 12A.
Figure 15C:
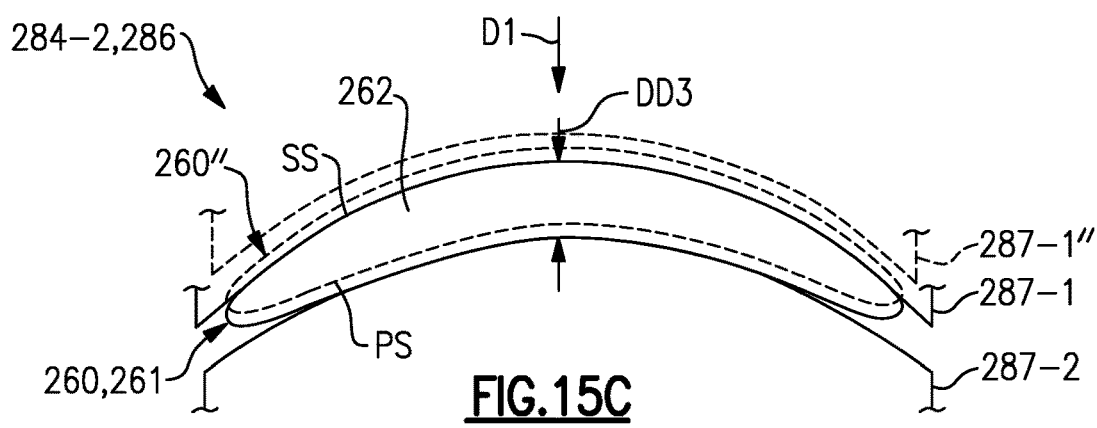
FIG. 15C illustrates the component of FIG. 9 in a third position relative to the dies of FIG. 12A.

FIGS. 15A-15C respectively illustrate three different positions of the component 260 relative to the first and second dies 287-1, 287-2. FIGS. 15A-15C omit the internal cavities 272 and ribs 274 of FIG. 9 for illustrative purposes. FIG. 15A illustrates a first position of the component 260 at step 280I. The dies 287-1, 287-2 are in an open position and are spaced apart by the first distance DD1 sufficient to allow positioning of at least a portion of the airfoil 261 between the dies 287-1, 287-2. As previously disclosed, step 280I can include simultaneously axially translating and rotating the airfoil 261 relative to the die axis LD such that the first distance DD1 is reduced as compared to opening the dies 287 relative to a maximum width of the airfoil 261, the maximum width being relative to all span positions of the airfoil 261. FIG. 15B illustrates a second position of the component 260 in which the first die 287-1 and component 260 are moved in the direction D1 towards the stationary second die 287-2 such that the dies 287-1, 287-2 are partially closed. Surfaces of the dies 287 adjacent the pressure and suction sides PS, SS of the airfoil 261 are spaced apart by a second distance DD2. The first position of the die 287-1' and component 260' are shown in dashed lines in FIG. 15B for illustrative purposes. The second distance DD2 is established such that surfaces of the airfoil 261 are placed in close proximity to surfaces of the dies 287-1, 287-2.

FIG. 15C illustrates a third position of the component 260 in which the first die 287-1 and component 260 are moved further in the direction D1 towards the second die 287-2 such that the dies 287-1, 287-2 are substantially or completely closed. In the third position surfaces of the dies 287-1, 287-2 adjacent the pressure and suction sides PS, SS of the airfoil 261 are spaced apart by a third distance DD3. The third distance DD3 is established such that surfaces of the airfoil 261 directly contact surfaces of the dies 287-1, 287-2. The second position of the die 287-1" and component 260" are shown in dashed lines in FIG. 15C for illustrative purposes. Although FIGS. 15B-15C illustrates the first die 287-1 moving between the first, second and third positions and the second die 287-2 being stationary, it should be appreciated that the second die 287-2 can be moved relative to the first die 287-1 and/or the component 260 to establish the second and/or third positions in accordance with the teachings disclosed herein. For example, the first die 287-1 can be stationary and the second die 287-2 can be moveable to position the component 260 relative to the dies 287.

Referring to FIGS. 8 and 15B, at step 280J the component 260 is preheated in the deforming station 284-2. Step 280J can include heating the airfoil section 262 to a first predefined temperature threshold for a predetermined heating duration between the dies 287 in the deforming machine 286 and prior to abutment with both (or at least one of) the dies 287. For example, the temperature of the component 260 can be elevated to at least 90% of a surface temperature of the dies 287, or more narrowly between 95% and 105% of the surface temperature, when the component 260 is positioned in the deforming machine 286 between, but prior to abutment with, both (or at least one of) the dies 287. In examples, the first predefined temperature threshold is equal to or greater than 1200 degrees Fahrenheit. The dies 287 can be heated to and continuously operating at a temperature of at least 1200 degrees Fahrenheit (F), or more narrowly between approximately 1300 and 1600 degrees Fahrenheit (F). The predetermined heating duration can be approximately 10-45 minutes, for example. It should be appreciated that other temperatures and heating durations can be utilized with the teachings disclosed herein. Each and every surface, or at least a majority of surfaces, of the airfoil 261 including the airfoil section 262 can be spaced apart from the dies 287 during step 280J, as illustrated by the second position of the component 260 of FIG. 15B.

Step 280I can include positioning the airfoil 261 between the dies 287 such that the airfoil 261 is spaced apart from surfaces of the dies 287, and step 280J can include convectively heating at least the airfoil section 262 between the dies 287 to the first predefined temperature threshold while the airfoil section 262 is in close proximity but spaced apart from surfaces of the dies 287. Surfaces of the dies 287 can be spaced apart from the airfoil 261 a distance of between approximately 0.100 and 0.300 inches during step 280J, for example.

Preheating the component 260 prior to deforming the airfoil 261 in the deforming station 284-2 can relax or otherwise reduce residual stresses in the component 260 due to attachment of the cover skin 270 to the airfoil body 268 during step 280G. For example, approximately 50% relaxation or movement of the airfoil section 262 toward a target aerodynamic profile can occur in response to preheating the component 260 to the first temperature threshold for the predetermined heating duration prior to deformation at step 280L.

At step 280K, the component 260 including the airfoil 261 is held, trapped or otherwise secured between the dies 287 subsequent to heating the airfoil 261 at step 280J, as illustrated by FIG. 15C. Step 280K can include moving at least the first die 287-1 in the direction D1 (FIGS. 12A and 15C) towards and into abutment with a respective one of the pressure and suction sides PS, SS of the airfoil section 262 to trap the airfoil 261 between the dies 287 subsequent to heating the component 260 at step 280J. In other examples, the first and second dies 287-1, 287-2 are moved in opposed directions D1, D2 (FIG. 12A-12B) towards and into abutment with respective ones of the pressure and suction sides PS, SS of the respective airfoil section 262.

At step 280L, the deforming machine 286 causes the airfoil section 262 of each airfoil 261 to deform or resize between the dies 287 subsequent to heating and securing the component 260 at steps 280J and 280K. The component 260 undergoes permanent deformation to vary a geometry of the walls 271 of the main body 268 and/or cover skin 270 (FIG. 9). The actuators 286C are operable to move at least one of the dies 287 together with the mounting plate 286D in response to signal(s) from controller CONT (shown in dashed lines in FIG. 12A). Movement of the die(s) 287 includes exerting a pressure on surfaces of the airfoil section 262 sufficient to cause a predetermined amount of deformation to occur. The dies 287 are operable to heat the component 260 to the first predefined temperature prior to holding the component 260 under compression by applying pressure from the actuators 286C.

The dies 287 are operable to conductively heat the component 260 to maintain a present temperature of the component 260 at or above the first predefined temperature threshold during deformation of the airfoil section 262 at step 280L. In examples, the dies 287 are operable to conductively heat the component 260 to a second predefined temperature threshold during step 280K and/or step 280L. The second predefined temperature threshold can be greater than the first predefined temperature threshold such that the temperature of the component 260 increases no more than approximately 1% to 5% above the first predefined temperature threshold, for example.

Each airfoil section 262 is clamped or held in compression between the dies 287 at, approximately, or above the first (or second) temperature threshold for a predetermined forming duration, such as approximately 20-40 minutes at approximately 1250-1350 degrees Fahrenheit (F), to cause the airfoil section 262 to permanently deform between the dies 287. The predetermined forming duration can be set to cause the airfoil section 262 to undergo creep deformation or hot sizing, to minimize or otherwise reduce the residual stresses in the component 260 that may be caused during the attaching step 280G, and to allow the walls 271 of the component 260 to conform to the surface profile of the dies 287. The first predefined temperature threshold and/or predetermined heating duration utilized during step 280J can be set such that all or substantially all residual stresses are relieved prior to or by the time of complete closure of the dies 287 at step 280K. In some examples, the deformation of the airfoil section 262 occurs such that a change in the stagger angle α (FIG. 7) of the of airfoil 261 that is presented to the deforming station 284-2 is no more than approximately 1 or 2 degrees, absolute, at the tip portion relative to the root section. The deformation due to hot sizing the component 260 can be less than about 0.1 inches, for example.

The dies 287 can serve as "gas sizing" dies that are utilized to cause at least a portion of the component 260 to undergo deformation. Creep deformation, hot sizing and gas sizing are generally known. However, utilization of such techniques to form the components in situ as disclosed herein are not known. For example, heating of the fluid F trapped in the internal cavities 272 (FIG. 9) of the component 260 during the attaching step 280G causes the internal cavities 272 to pressurize and the walls 271 of the airfoil section 262 to move outwardly or otherwise deform during the deforming step 280L.

Referring to FIGS. 8 and 10, at step 280M the component 260 together with the support fixture SF is moved from the deforming station 284-2 along a segment of the substantially arcuate path AP to the cool down station 284-3 where the component 260 enters a controlled cool down phase subsequent to the deforming step 280L. The arcuate path AP extends between the dies 287 and the cooling chamber 288, as illustrated in FIG. 10.

The cooling chamber 288 can include a double wall arrangement having an inner wall 288A at least partially surrounded by an outer wall 288B. The inner wall 288A establishes a cooling cavity 288C dimensioned to receive at least a portion of the component 260. The cooling cavity 288C can have a generally circular or elliptical geometry, as illustrated in FIG. 10 for example, or can have alternative configurations tailored to a geometry of the component 260. The inner and outer walls 288A, 288B cooperate to establish a feeding cavity 288D. The feeding cavity 288D can be coupled to a cooling source CS (shown in dashed lines for illustrative purposes). The cooling source CS is operable to convey pressurized cooling flow CF to the feeding cavity 288D. The cooling flow CF can be air or another gas such as argon or helium. The inner wall 288A can be perforated and can include a plurality of ports (see, e.g., ports 388P of FIG. 16A) to eject the cooling flow CF from the feeding cavity 288D into the cooling cavity 288C in a direction toward the component 260. At least some of the cooling flow CF can be ejected from the feeding cavity 288D to impinge on surfaces of the component 260.

The component 260 can be oriented in the cooling chamber 288 at step 280N, including moving at least a portion of the component 260 through an opening 288E and into the cooling cavity 288C. The opening 288E can be established along a top of the cooling chamber 288, and step 280N can include translating the component 260 along a longitudinal axis LA of the cooling cavity 288C. The cooling chamber 288 can be dimensioned such that the longitudinal axis LA has a major component that extends in the vertical direction, for example. At least a majority, or an entirety, of the airfoil section 262 can be inserted through the opening 288E and into the cooling cavity 288C. For example, the component 260 can be situated in the cooling cavity 288C such that the airfoil section 262 at between approximately 0% and approximately 5% span is aligned with or extends across the opening 288E relative to the longitudinal axis LA. At least a portion or an entirety of the root section 264 can be inserted into cooling cavity 288C while being held by the support fixture SF.

At step 280P, the component 260 including airfoil 261 is cooled in the cooling chamber 288 to a third predefined temperature threshold for a predetermined cooling duration subsequent to the deforming step 280L. The third predefined temperature threshold is less than the first and/or second predefined temperature thresholds. The third predefined temperature threshold can be a temperature of between approximately 50 degrees and 300 degrees Fahrenheit (F), such as approximately room temperature, for example. The predetermined cooling duration can be approximately 20-30 minutes, for example. It should be appreciated that other temperatures and cool down durations can be utilized with the teachings disclosed herein. The controlled cool down phase can reduce residual stresses that may otherwise be reintroduced in the component 260 were the component 260 to otherwise be moved directly from the deforming station 284-2 to the unloading station 284-4 at room temperature.

Figure 16A:
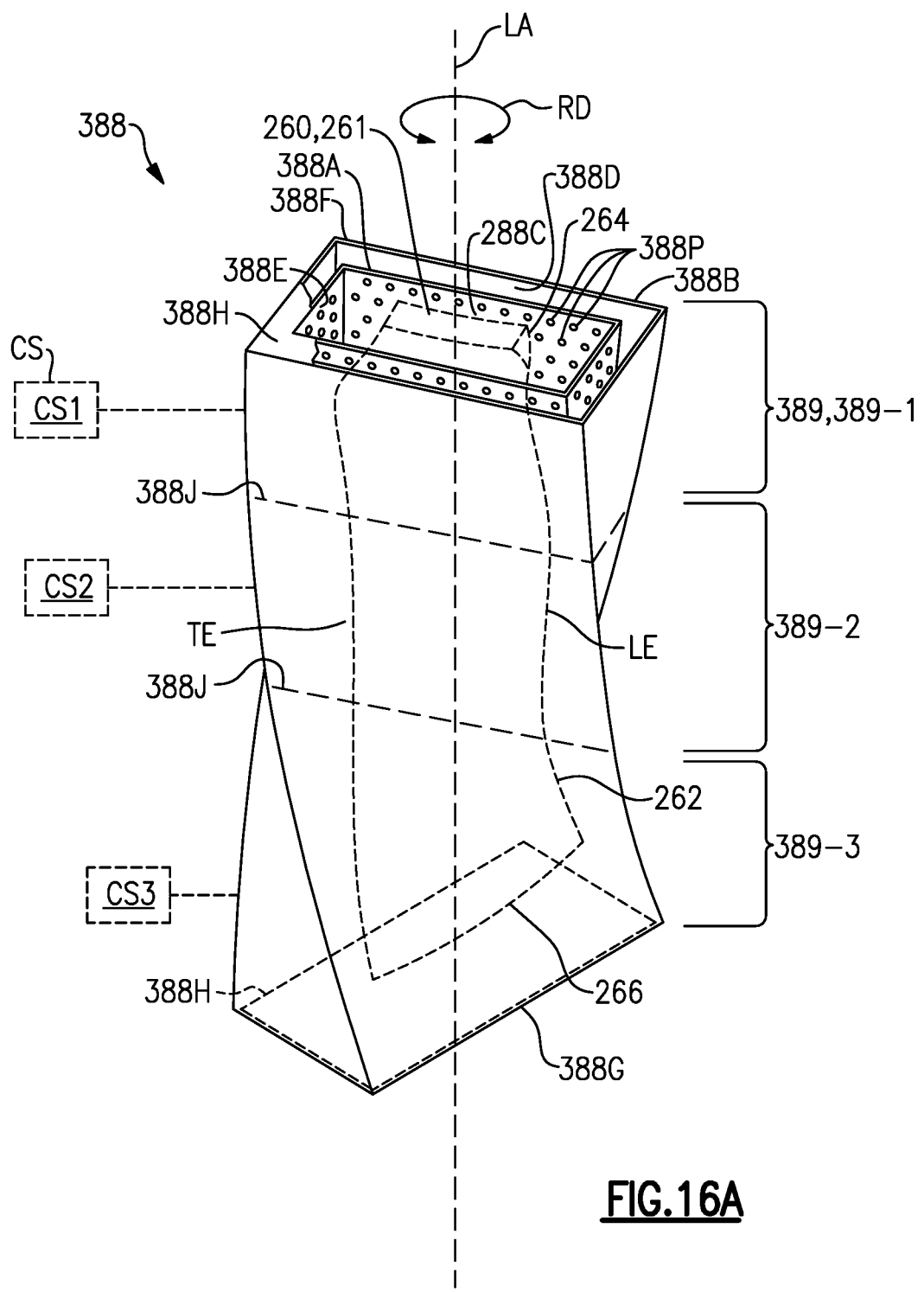
FIG. 16A illustrates a perspective view of a component arranged in a cooling chamber according to an example.
Figure 16B:
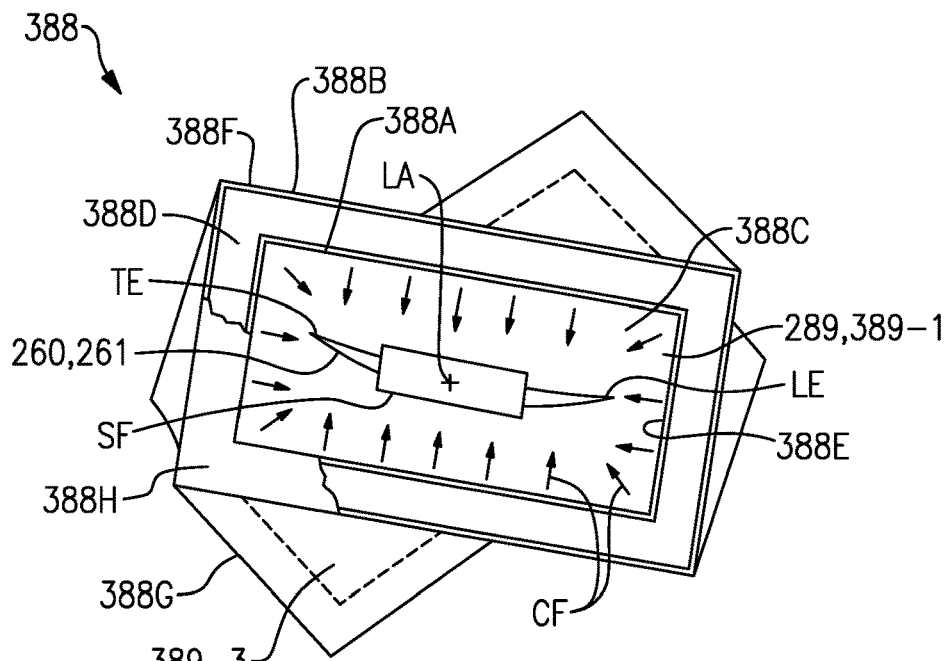
FIG. 16B illustrates a plan view of the component situated in the cooling chamber of FIG. 16A.
Figure 16C:
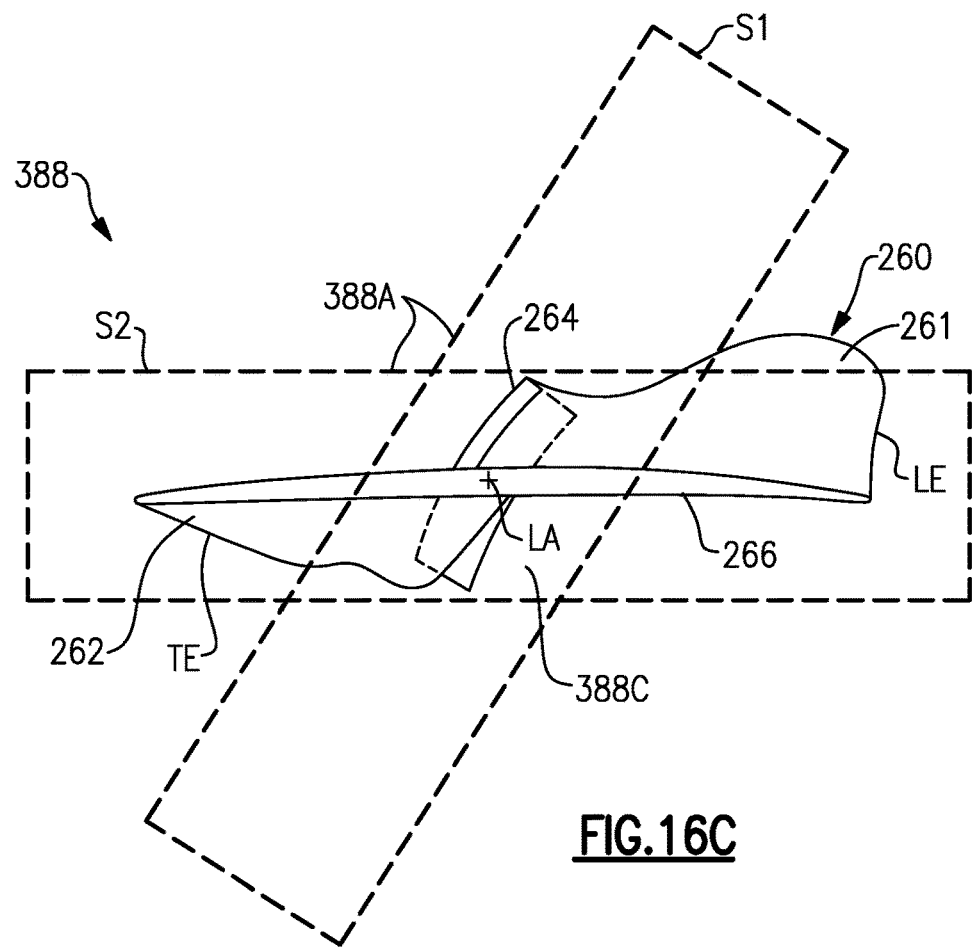
FIG. 16C illustrates another plan view of the component situated in the cooling chamber of FIG. 16A.

Other cooling chamber geometries can be utilized to cool the component 260. FIGS. 16A-16C illustrate a cooling chamber 388 according to another example. Cooling chamber 388 includes inner and outer walls 388A, 388B having a generally rectangular or otherwise non-elliptical cross sectional geometry. Airfoil 261 is shown in dashed lines in FIG. 16A for illustrative purposes. The inner and outer walls 388A, 388B are twisted about a longitudinal axis LA of cooling cavity 388C such that a perimeter of the cooling chamber 388 at a first end portion 388F is offset from a perimeter of the cooling chamber 388 at a second end portion 388G opposed to the first end portion 388F, as illustrated by FIG. 16B (see also FIG. 16C). The inner and outer walls 388A, 388B can be twisted about the longitudinal axis LA with respect to a stagger angle of the airfoil 261, including any of the stagger angles disclosed herein. The inner wall 388A can be dimensioned to provide substantially equidistant cooling with surfaces of the component 260 in the cooling cavity 388C. Each end portion 388F, 388G can include a respective plate 388H (FIG. 16A) to bound the feeding cavity 388 between the end portions 388F, 388G and to bound the cooling cavity 388C along the second end portion 388G.

Step 280N can include translating the airfoil 261 axially along the longitudinal axis LA between first and second positions and rotating the airfoil 261 in a direction RD (FIG. 16A) about the longitudinal axis LA between the first and second positions. The first position can correspond to axial alignment of the tip portion 266 of the airfoil 261 and the first end portion 388F, and the second position can correspond to the tip portion 266 of the airfoil 261 being axially adjacent to the second end portion 388G, as illustrated in FIG. 16A.

FIG. 16C illustrates the airfoil 261 in the second position. For illustrative purposes, two sections S1, S2 of the inner wall 388A taken along the longitudinal axis LA are shown in dashed lines corresponding to approximately 0% span and approximately 100% span of the airfoil section 262. In the illustrative example of FIG. 16C, the component 260 has a stagger angle of approximately 60 degrees at 100% span relative to 0% span. A cross sectional area of the cooling cavity 388C can be defined with respect to a cross sectional area of the airfoil 261. For example, at section S1 of the cooling cavity 388C a first area ratio of a cross sectional area of the airfoil section 262 to a cross sectional area of the cooling cavity 388C can be between approximately 0.10 to approximately 0.15. At section S2 of the cooling cavity 388C, a second area ratio of the cross sectional area of the airfoil section 262 to the cross sectional area of the cooling cavity 388C is between approximately 0.02 and approximately 0.05. The cooling cavity 388 can be dimensioned such that a ratio of the first area ratio to the second area ratio is between approximately 0.1 and approximately 0.5, and such that a variation in distance between surfaces of the inner wall 388A and surfaces of the airfoil 261 is equal to or greater than approximately 1:1, or more narrowly less than or equal to approximately 1:1.5.

The area ratios disclosed herein can reduce average spacing between the inner wall 388A and surfaces of the airfoil 261 and increase temperature uniformity at the respective span positions. Applicant has found that a cylindrical cooling cavity can have approximately 8 times more variation in distance than the disclosed cooling chamber 388 at approximately 50% span of a common airfoil. Uniformity in cooling can minimize or otherwise reduce introduction of residual stresses into the airfoil during cooling, which can improve a fatigue capability of the airfoil during engine service. Also, any residual stresses that are introduced during the cooling can be more uniform over the entire airfoil as opposed to areas of non-uniformity in residual stresses that may occur with a cubic shaped or cylindrical shaped cooling configuration. The uniformity in cooling can also increase a likelihood of retaining a final shape of the airfoil that was established during the forming operation during step 280L.

Still referring to FIGS. 16A-16C, the airfoil 261 can be simultaneously axially translated along the longitudinal axis LA and rotated in the direction RD to maintain a proper distance between the airfoil 261 and the inner wall 388A (e.g., between 1-2 inches of clearance). A major component of the longitudinal axis LA can extend in the vertical direction with the opening 388E defined along a top of the cooling chamber 388, or can extend in the horizontal direction with the opening 388E defined along a side of the cooling chamber 388, for example.

Feeding cavity 388D can be compartmentalized such that a plurality of cooling regions (or zones) 389 are established along the longitudinal axis LA to provide localized cooling to portions of the component 260. In the illustrative example of FIG. 16A, three separate and distinct cooling regions 389-1, 389-2, 389-3 are established. The cooling regions 389 can extend along approximately equal distances of a total span of the cooling cavity 388C along the longitudinal axis LA, for example. It should be appreciated that the cooling chamber 388 can be configured to establish fewer or more than three cooling regions 389. Step 280P can include conveying cooling flow CF to the cooling regions 389 such that a predefined temperature gradient is established between the first and second end portions 388F, 388G of the cooling chamber 388. The cooling chamber 388 can be configured such that a localized temperature in cooling region 389-2 differs at least 5 or 10% from a localized temperature in each of the adjacent cooling regions 389-1, 389-3, for example. In examples, the cooling flow CF conveyed to cooling region 389-1 is approximately 40 degrees Fahrenheit (F), and the cooling flow CF conveyed to cooling region 389-3 is approximately 70 degrees Fahrenheit (F). The localized cooling flow CF can be set with respect to an average mass of the component 260 to be cooled in the respective region 389. The localized cooling can reduce a likelihood of reintroducing residual stresses in the component 260. In another example, cooling flow CF conveyed to cooling regions 389-1, 389-2 and 389-3 is approximately 40, 65 and 90 degrees Fahrenheit (F), respectively, such that the heavier cross-sections of the component 260 (e.g., portions of the component 260 comprising the root section 264) are cooled at substantially the same rate as the thinnest cross-section of the component 260 (e.g., portions of the component 260 comprising or near the tip portion 266).

Various techniques can be utilized to establish the cooling regions 389, including conveying cooling flow CF from cooling source CS (shown in dashed lines in FIG. 16A for illustrative purposes) at different temperatures and/or pressures to each of the cooling regions 389-1, 389-2, 389-3. For example, a cross sectional area of the ports 388P along the inner wall 388A can differ to eject flow at different velocities and/or pressures to establish the cooling regions 389-1, 389-2, 389-3. In examples, the cooling chamber 388 includes one or more partitions 388J (shown in dashed lines in FIG. 16A for illustrative purposes) to establish the cooling regions 389-1, 389-2, 389-3. The partitions 388J can serve to increase rigidity of the cooling chamber 388, including during pressurization of the feeding cavity 388D. A common cooling source CS can be utilized to convey cooling flow F to the cooling regions 389-1, 389-2, 389-3. In other examples, dedicated cooling sources CS1-CS3 (FIG. 16A) are operable to convey cooling flow CF at different pressures and/or temperatures to the respective cooling regions 389-1, 389-2, 389-3.

Referring to FIGS. 8 and 10, at step 280Q each component 260 is moved from the cooling station 284-3 to the unloading station 284-4 and unloaded from the unloading station 284-4. The components 260 can be loaded into the support fixture SF at the loading station 284-1 and unloaded from the respective support fixture SF at the unloading station 284-4 utilizing various techniques, such as by a robot or manually.

One or more finishing steps can be performed subsequent to unloading the components 260 at step 280Q. For example, an interior inspection of the component 260 can occur at step 280R. One or more final machining operations of the component 260 can occur at step 280S. A final inspection of the component 260 can occur at step 280T.

The techniques disclosed herein can be utilized to rapidly dimensionally correct the components subsequent to welding or otherwise attaching the various components. The process can be performed in an open air environment, which can reduce complexity.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of forming a gas turbine engine component comprising:
    attaching a cover skin to an airfoil body, the airfoil body and the cover skin cooperating to establish pressure and suction sides of an airfoil;
    positioning the airfoil between first and second dies of a deforming station;
    heating the airfoil body to a first predefined temperature threshold between the first and second dies;
    moving the first die relative to the second die to hold the airfoil between the first and second dies subsequent to the heating step, and then deforming the airfoil between the first and second dies;
    moving the airfoil from the deforming station to a cooling chamber of a cool down station subsequent to the deforming step;
    cooling the airfoil in the cooling chamber to a second predefined temperature threshold less than the first predefined temperature threshold;
    wherein walls of the cooling chamber are twisted about the longitudinal axis such that a first end portion of the cooling chamber is offset from a second, opposed end portion of the cooling chamber.

2. The method as recited in claim 1, wherein the airfoil is a fan blade.

3. The method as recited in claim 1, wherein the airfoil is metallic.

4. The method as recited in claim 1, wherein at least a majority of surfaces of the airfoil are spaced apart from the first and second dies during the heating step.

5. The method as recited in claim 1, wherein the positioning step includes suspending the airfoil in a vertical direction from a support fixture and moving the airfoil in the vertical direction between the first and second dies.

6. The method as recited in claim 1, wherein the step of moving the airfoil from the deforming station to the cooling chamber includes moving the airfoil along a substantially arcuate path extending between the first and second dies and the cooling chamber.

7. The method as recited in claim 1, wherein the step of moving the airfoil includes translating the airfoil axially along a longitudinal axis of the cooling chamber between first and second positions, and rotating the airfoil about the longitudinal axis between the first and second positions.

8. The method as recited in claim 1, further comprising conveying cooling flow to a plurality of cooling regions along the longitudinal axis of the cooling chamber such that a predefined temperature gradient is established between the first and second end portions during the cooling step.

9. The method as recited in claim 1, wherein the airfoil body extends from a root section to a tip portion, the tip portion defines a stagger angle relative to the root section, and the stagger angle is greater than or equal to 10 degrees, absolute, prior to the attaching step.

10. The method as recited in claim 9, wherein the deforming step occurs such that a change in the stagger angle of the airfoil presented to the deforming station is no more than 2 degrees, absolute.

11. The method as recited in claim 9, wherein the first predefined temperature threshold is equal to or greater than 1200 degrees Fahrenheit.

12. The method as recited in claim 9, wherein the attaching step includes welding at least a perimeter of the cover skin to the airfoil body, and the cover skin is dimensioned to enclose at least one internal cavity in the airfoil body.

13. A method of forming a gas turbine engine component comprising:
    welding a cover skin to an airfoil body to define an airfoil such that the airfoil body is twisted along a spanwise axis to define a stagger angle;
    heating the airfoil body and the cover skin to a predefined temperature threshold between first and second dies of a deforming station while the airfoil body and the cover skin are spaced apart from the first and second dies;
    deforming the airfoil between the first and second dies subsequent to the heating step;
    moving the airfoil from the first and second dies to a cooling chamber subsequent to the deforming step, wherein walls of the cooling chamber are twisted along a longitudinal axis of the cooling chamber between first and second end portions of the cooling chamber such that a perimeter of the cooling chamber at the first end portion is substantially offset from a perimeter of the cooling chamber at the second end portion; and
    cooling the airfoil in the cooling chamber.

14. The method as recited in claim 13, further comprising moving the first die towards the second die to hold the airfoil body between the first and second dies subsequent to the heating step, but prior to the deforming step.

15. The method as recited in claim 13, wherein:
    the airfoil body extends from a root section to a tip portion, and the stagger angle is greater than or equal to 10 degrees, absolute, at the tip portion relative to the root section prior to the welding step; and
    the deforming step occurs such that a change in the stagger angle of the airfoil presented to the deforming station is no more than 1 degree, absolute.

16. The method as recited in claim 15, wherein the welding step includes enclosing at least one internal cavity between the airfoil body and the cover skin.

17. The method as recited in claim 13, further comprising:
    rotating the airfoil about the longitudinal axis between first and second positions.

18. The method as recited in claim 17, wherein the cooling step includes conveying cooling flow to at least three separate and distinct cooling regions along the longitudinal axis of the cooling chamber such that a predefined temperature gradient is established between the first and second end portions.

* * * * *